(12) United States Patent
Walker et al.

(10) Patent No.: US 8,591,343 B2
(45) Date of Patent: Nov. 26, 2013

(54) SYSTEMS AND METHODS FOR GAMING DONGLES

(75) Inventors: Jay S. Walker, Ridgefield, CT (US); Jeffrey Y. Hayashida, San Francisco, CA (US); Russell P. Sammon, San Francisco, CA (US); Carson C. Fincham, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 39 days.

(21) Appl. No.: 13/021,449

(22) Filed: Feb. 4, 2011

(65) Prior Publication Data

US 2011/0124418 A1    May 26, 2011

Related U.S. Application Data

(63) Continuation of application No. 12/645,142, filed on Dec. 22, 2009, now abandoned, which is a continuation of application No. 11/776,775, filed on Jul. 12, 2007, now abandoned.

(60) Provisional application No. 60/807,160, filed on Jul. 12, 2006, provisional application No. 60/807,150, filed on Jul. 12, 2006, provisional application No. 60/807,171, filed on Jul. 12, 2006, provisional application No. 60/807,133, filed on Jul. 12, 2006.

(51) Int. Cl.
*A63F 9/24* (2006.01)

(52) U.S. Cl.
USPC ........... 463/43; 455/456.4; 235/380; 235/492

(58) Field of Classification Search
None
See application file for complete search history.

(56) References Cited

U.S. PATENT DOCUMENTS

| | | | | |
|---|---|---|---|---|
| 5,778,304 A * | 7/1998 | Grube et al. | | 455/456.4 |
| 5,936,227 A * | 8/1999 | Truggelmann et al. | | 235/492 |
| 6,320,495 B1 * | 11/2001 | Sporgis | | 340/323 R |
| D454,910 S * | 3/2002 | Smith et al. | | D19/9 |
| 6,895,238 B2 * | 5/2005 | Newell et al. | | 455/414.2 |
| 6,961,561 B2 * | 11/2005 | Himmel et al. | | 455/419 |
| 6,983,888 B2 | 1/2006 | Weng | | |
| 7,118,476 B1 * | 10/2006 | White et al. | | 463/17 |
| 7,124,955 B2 | 10/2006 | Lasch et al. | | |
| 7,156,301 B1 * | 1/2007 | Bonalle et al. | | 235/380 |
| 7,213,766 B2 | 5/2007 | Ryan et al. | | |
| 7,597,250 B2 | 10/2009 | Finn | | |
| 7,597,619 B2 | 10/2009 | Crivelli et al. | | |
| 7,762,470 B2 | 7/2010 | Finn et al. | | |
| 2002/0040935 A1 * | 4/2002 | Weyant | | 235/487 |

(Continued)

OTHER PUBLICATIONS

Office Action for U.S. Appl. No. 11/776,775 mailed Sep. 25, 2009, 19 pp.
Office Action for U.S. Appl. No. 11/776,775 mailed Jul. 28, 2008, 14 pp.
Office Action for U.S. Appl. No. 12/645,142 mailed Aug. 4, 2010, 14 pp.

*Primary Examiner* — Paul A D'Agostino
(74) *Attorney, Agent, or Firm* — Fincham Downs, LLC; Carson C. X. Fincham

(57) ABSTRACT

Some embodiments are associated with gaming dongles. Some gaming dongles may store value that is utilized to play a video game and/or to participate in a video game tournament. Some gaming dongles may determine and/or store gaming signatures, biometric information, and/or Global Positioning System (GPS) information. Some gaming dongles may be removably coupled. Some gaming dongles may have two or more portions that may be substantially irreversibly separated, such as by snapping-off one portion from the other.

19 Claims, 8 Drawing Sheets

(56) References Cited

U.S. PATENT DOCUMENTS

| | | | |
|---|---|---|---|
| 2002/0111213 A1* | 8/2002 | McEntee et al. | 463/42 |
| 2003/0236821 A1 | 12/2003 | Jiau | |
| 2004/0144846 A1* | 7/2004 | Lasch et al. | 235/487 |
| 2005/0109841 A1* | 5/2005 | Ryan et al. | 235/380 |
| 2006/0030394 A1* | 2/2006 | Crivelli et al. | 463/17 |
| 2006/0208066 A1* | 9/2006 | Finn et al. | 235/380 |
| 2007/0060371 A1* | 3/2007 | Puzik | 463/42 |
| 2010/0160013 A1* | 6/2010 | Sanders | 463/6 |

\* cited by examiner

SYSTEMS AND METHODS FOR GAMING DONGLES

CROSS-REFERENCE TO RELATED APPLICATIONS

The present application is a continuation of U.S. patent application Ser. No. 12/645,142 entitled "SYSTEMS AND METHODS FOR GAMING DONGLES" filed Dec. 22, 2009; which is a continuation of U.S. patent application Ser. No. 11/776,775 entitled "SYSTEMS AND METHODS FOR GAMING DONGLES" filed Jul. 12, 2007 which claims benefit and priority under 35 U.S.C. §119(e) to:

(i) U.S. Provisional Patent Application Ser. No. 60/807,160 entitled "METHODS AND APPARATUS FOR FACILITATING AUTHENTICATION OF OUTCOMES" filed Jul. 12, 2006;

(ii) U.S. Provisional Patent Application Ser. No. 60/807,150 entitled "METHODS AND APPARATUS FOR FACILITATING REDEMPTION OF AUTHENTICATED OUTCOMES" filed Jul. 12, 2006;

(iii) U.S. Provisional Patent Application Ser. No. 60/807,171 entitled "METHODS AND APPARATUS FOR FACILITATING GAMING COMPETITIONS" filed Jul. 12, 2006; and (iv) U.S. Provisional Patent Application Ser. No. 60/807,133 entitled "METHODS AND APPARATUS FOR FACILITATING VERIFICATION OF GAMING INPUTS" filed Jul. 12, 2006.

Each of the above applications is incorporated by reference in its entirety.

The present application is also related to U.S. patent application Ser. No. 11/284,309 entitled "METHODS AND APPARATUS FOR AWARDING PRIZES BASED ON AUTHENTICATION OF COMPUTER GENERATED OUTCOMES USING COUPONS" filed Nov. 21, 2005 and which issued as U.S. Pat. No. 7,362,862 on Apr. 22, 2008, which is a continuation of U.S. patent application Ser. No. 10/309,406 entitled "METHODS AND APPARATUS FOR AWARDING PRIZES BASED ON AUTHENTICATION OF COMPUTER GENERATED OUTCOMES USING COUPONS" filed Dec. 3, 2002, now abandoned, which is a continuation-in-part of U.S. patent application Ser. No. 09/298,226 entitled "REMOTE-AUDITING OF COMPUTER GENERATED OUTCOMES, AUTHENTICATED BILLING AND ACCESS CONTROL, AND SOFTWARE METERING SYSTEM USING CRYPTOGRAPHIC AND OTHER PROTOCOLS" filed Apr. 22, 1999, now abandoned, which is itself a continuation of U.S. patent application Ser. No. 08/677,544 entitled "REMOTE-AUDITING OF COMPUTER GENERATED OUTCOMES, AUTHENTICATED BILLING AND ACCESS CONTROL, AND SOFTWARE METERING SYSTEM USING CRYPTOGRAPHIC AND OTHER PROTOCOLS" filed Aug. 8, 1996, and which issued as U.S. Pat. No. 5,970,143 on Oct. 19, 1999, and which is a continuation-in-part of U.S. patent application Ser. No. 08/561,668 entitled "REMOTE AUDITING OF COMPUTER GENERATED OUTCOMES AND AUTHENTICATED BILLING AND ACCESS CONTROL SYSTEM USING CRYPTOGRAPHIC AND OTHER PROTOCOLS" filed Nov. 22, 1995, and which issued as U.S. Pat. No. 5,768,382 on Jun. 16, 1998.

The entirety of each of these applications is hereby incorporated by reference herein.

BACKGROUND

Video games, online video games, and online video game tournaments have become increasingly popular. While participation in some of such games may require an initial investment (e.g., purchasing a game program) or be free of charge, much online gaming, particularly for 'premium' online games, requires payment for participation, which is usually provided in the form of monthly fees. Fee payment typically requires a player to maintain and/or purchase an account with an online gaming provider. Such payment methodologies may, however, not be advantageous in many circumstances.

Further, even by paying these fees, the fairness of online gaming or other gaming tournaments is not guaranteed. Online gaming, for example, is subject to hacking and the use of 'bots', while offline gaming tournaments are fraught with even more uncertainty.

Accordingly, there exists a need for systems and methods that address these and other problems found in existing gaming technologies

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
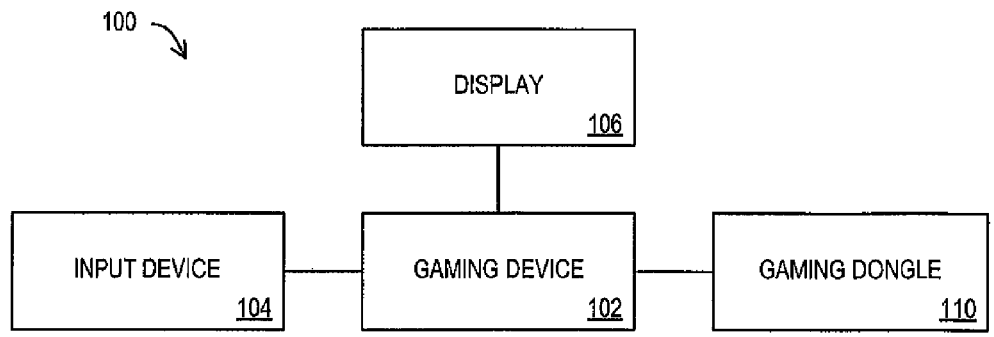
FIG. 1 is a block diagram of a system according to some embodiments.

Applicants have recognized that, in some situations, it may be advantageous to provide a gaming dongle that is capable of storing a value and/or an amount of value that may be utilized to gain access to and/or participate in video games and/or online video games or tournaments. According to some embodiments, the value may be replenished and/or recharged. In some embodiments, the value may be stored in a secure and/or removable portion of a gaming dongle. In some embodiments, the value may be stored in a gaming dongle that also stores at least a portion of a game program that is utilized to execute play of a particular video game.

Applicants have also recognized that it may be advantageous to provide a gaming dongle that is operable to determine and/or facilitate a determination of a gaming signature of a player. In some embodiments, a gaming device may make such a determination while an indication of the determined gaming signature may be stored in one or more portions of the gaming dongle.

Applicants have also recognized that it may be advantageous to provide a gaming dongle that is operable to facilitate verification of video game results. A gaming dongle may, for example, comprise: (i) a gaming signature recognition device to capture gaming signature information of a player of a video game, where the gaming signature information may be utilized to verify an identity of the player of the video game; (ii) a biometric device to capture biometric information that may be utilized to verify an identity of a player of a video game; and/or (iii) a Global Positioning System (GPS) device to capture location information that may be utilized to verify a location where a video game result is achieved.

Applicants have further recognized that implementation of some embodiments may be advantageously effectuated by providing a two-piece (and/or multiple piece) gaming dongle. One portion of the gaming dongle may be utilized to execute a video game program, for example, while another portion of the gaming dongle may be utilized to securely store: (i) value and/or an amount of value; (ii) player gaming signature data; (iii) player biometric data; (iv) GPS data associated with the gaming dongle (or portion thereof); and/or (v) encryption data. In some embodiments, two or more portions of the gamin dongle may be removably coupled and reversibly separable. In other words, the two or more portions may be disconnected and reconnected as desired. In some embodiments, two or more portions of the gaming dongle may be removably coupled and substantially irreversible separated. In other words, the two or more portions may be separated in a substantially permanent manner, such as by snapping and/or pulling them apart, severing a physical link between the portions, breaking and/or twisting them apart, etc.

According to one or more embodiments, a system (e.g., a gaming dongle) may comprise: (i) a first connector oriented to removably couple to a gaming device; (ii) a first memory in communication with the first connector; (iii) a secure perimeter, comprising a second memory in communication with the first connector, the second memory storing an indication of an amount of value, wherein some portion of the amount of value is consumed by an execution of a game program; and (iv) a second connector in communication with the second memory, wherein the second connector is oriented to interface with a device operable to replenish the amount of value. In some embodiments, the first memory may store at least a portion of the game program.

According to one or more embodiments, a system (e.g., a gaming dongle) may comprise: (i) a first dongle portion, comprising: (a) a first connector oriented to removably couple to a gaming device; and (b) a first memory in communication with the first connector, the first memory storing a game program; and (ii) a second dongle portion, comprising: (c) a second connector oriented to removably couple to the first dongle portion; and (d) a secure perimeter, comprising a second memory in communication with the second connector, the second memory storing an indication of an amount of value, wherein some portion of the amount of value is consumed by an execution of the game program.

In some embodiments, a method may comprise: (i) receiving, in connection with a play of a video game by a player, an indication of a game play input provided by the player; (ii) determining, based on the indication of the game play input and based upon a context of the input, a game play input characteristic of the player; (iii) determining, based at least in part on the game play input characteristic of the player, a gaming signature representative of the player; and (iv) utilizing the gaming signature representative of the player to verify a game result submitted by the player.

According to some embodiments, a method may comprise: (i) conducting a video game, by a gaming device, wherein the conducting comprises executing a game program stored in a first memory of a dongle removably coupled to the gaming device; (ii) receiving, via an input device of the gaming device, indications of gaming input provided by a player of the video game; (iii) determining, based on the gaming input provided by the player, a gaming signature of the player; (iv) determining, by the gaming device, an outcome of the video game; and (v) storing the outcome of the video game and an indication of the gaming signature of the player in a second memory of the dongle.

In some embodiments, a method may comprise: (i) providing, to a player of a video game, a two-piece dongle, wherein the first piece of the dongle stores a game program operable to facilitate execution of the video game, and wherein the second piece of the dongle comprises a memory disposed within a secure perimeter; (ii) receiving, from the player and after a play of the video game by the player, the second piece of the dongle, wherein the memory of the second piece of the dongle stores (a) an indication of an outcome of the play of the video game and (b) verification information; (iii) verifying, utilizing the verification information, that the game outcome was properly achieved by the player; and (iv) providing, after the verifying and based on the game outcome, a prize to the player.

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

Some embodiments described herein are associated with a "gaming device". As used herein, the term "gaming device" may generally refer to any device that is operable to execute or facilitate the execution of a game program. Gaming devices may comprise, for example, Personal Computer (PC) devices, laptop and/or tablet computers, Personal Digital Assistant (PDA) devices, cellular or other wireless telephones (e.g., the Apple® iPhone™), video game consoles (e.g., Microsoft® Xbox 360™, Sony® Playstation® 3, and/or Nintendo® Wii™), and/or handheld or portable video game devices (e.g., Nintendo® Game Boy® or Nintendo® DS™). Gaming devices may comprise and/or interface with various components such as input and output devices and gaming dongles (such as in accordance with embodiments described herein).

Some embodiments described herein are associated with a "dongle" or a "gaming dongle". As used herein, the terms "dongle" and "gaming dongle" are used interchangeably and may generally refer to any device that is operable to communicate with a gaming device to facilitate execution of a video game program. Examples of a dongle may include, but are not limited to, for example, a cable, an adapter, a connector, a cartridge (e.g., a game cartridge), a disk (e.g., a 'floppy' disk, CD-ROM, DVD, mini-disk), a Static Random Access Memory (SRAM) device or module, a solid-state memory device, a flash memory device, a memory card device, and/or a network communication path, connection, port, and/or cable. In some embodiments, dongles may be coupled and/or removably coupled to a gaming device or portion thereof to facilitate communications therewith. A dongle may be coupled via a connector to a Universal Serial Bus (USB) port of a gaming device, for example, and/or may be coupled to a gamepad input device associated with the gaming device (e.g., a wired and/or wireless gamepad device). In some embodiments, the gaming device may be operable to execute a video game program in the absence of a dongle, while in some embodiments the dongle may be required to permit execution of the video game program (e.g., similar to the more historic computing arts usage of the term "dongle"). According to some embodiments, dongles may be comprised of various parts, portions, segments, and/or pieces. Some dongles, for example, may comprise multiple dongles coupled to and/or in communication with each other. In some embodiments, as described herein, dongle segments, portions, and/or pieces may be substantially irreplaceably separated (e.g., snapped-off and/or twisted apart). Some dongles may comprise one or more components such as one or more: input devices, output devices, memory devices, processing devices, biometric devices, GPS devices, and/or encryption devices.

Some embodiments described herein are associated with an "input device". As used herein, the term "input device" may generally refer to any device that is used to receive or process input. An input device may communicate with and/or be part of another device (e.g., a gaming device and/or a gaming dongle). Some examples of input devices include, but are not limited to: a game controller and/or gamepad, a barcode scanner, a magnetic stripe reader, a computer keyboard, a pointing device (e.g., a computer mouse, touchpad, and/or trackball), a point-of-sale terminal keypad, a touch-screen, a microphone, an infrared sensor, a sonic ranger, a computer port, a video camera, a motion detector, a digital camera, a network card, a Universal Serial Bus (USB) port, a GPS receiver, a Radio Frequency Identification (RFID) receiver, a RF receiver, a thermometer, a pressure sensor, and a weight scale or mass balance.

Some embodiments described herein are associated with an "output device". As used herein, the term "output device" may generally refer to a device that is used to output information. An output device may communicate with and/or be part of another device (e.g., a gaming device and/or a gaming dongle). Possible output devices may include, but are not limited to: a Cathode Ray Tube (CRT) monitor, a Liquid Crystal Display (LCD) screen, a Light Emitting Diode (LED) screen, a printer, an audio speaker, an Infra-red Radiation (IR) transmitter, an RF transmitter, and/or a data port.

Some embodiments herein are associated with "communication". As used herein, the term "communication" may refer to any information, data, and/or signal that is provided, transmitted, received, and/or otherwise processed by an entity, and/or that is shared or exchanged between two or more people, devices, and/or other entities.

As used herein, the terms "information" and "data" may be used interchangeably and may refer to any data, text, voice, video, image, message, bit, packet, pulse, tone, waveform, and/or other type or configuration of signal and/or information. Information may be or include information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encrypted, and/or otherwise packaged or manipulated in accordance with any method that is or becomes known or practicable.

Some embodiments described herein are associated with a "communication session". As used herein, the phrase "communication session" may refer to any instance and/or occurrence of a receipt, transmittal, exchange, and/or sharing of information associated with the communication between two or more parties and/or entities. A communication session may include, for example, an e-mail transmittal, receipt, and/or exchange, an Instant Messaging (IM) session, a voice call (e.g., over a Public Switched Telephone Network (PSTN), a cellular network, or Voice over IP (VoIP)), a file upload, download, and/or exchange, a receipt and/or transmittal of broadcast media, and/or any combination thereof. Communication sessions may include continuous, periodic, intermittent, and/or any other frequency of communication that is or becomes known or practicable.

Some embodiments described herein are associated with a "communication link". As used herein, the phrase "communication link" may refer to any connection, wire, port, device, and/or signal and/or any transmission, exchange, repeating, and/or other flow of information or data that is associated with the establishing, maintaining, facilitation, and/or other management and/or participation in a communication session. In some embodiments, a communication link may involve a "handshake", multiplexing and/or de-multiplexing of signals, encryption and/or decryption of data, data validation, data conversion, and/or implementation of one or more compression, transmission, and/or communication protocols.

III. Systems and Apparatus

A. Introduction

Generally, a gaming dongle for use with the some embodiments may comprise a device that is capable of: (i) determining, recording, and/or storing value for use in playing video games; (ii) determining, recording, and/or storing a gaming signature of a player for use in verifying game results; (iii) determining, recording, and/or storing biometric data of a player for use in verifying game results; and/or (iv) determining, recording, and/or storing GPS data for use in verifying game results. In some embodiments, the gaming dongle may comprise a plurality of separable and/or substantially irreversibly separable portions.

Referring first to FIG. 1, a block diagram of a system 100 according to some embodiments is shown. The system 100 may comprise, for example, a gaming device 102 in communication with an input device 104 and an output device 106. In some embodiments, the gaming device 102 may be in communication with and/or coupled to a gaming dongle 110. Any or all of the components 102, 104, 106, 110 of the system 100 may communicate via any means that is or becomes known or practicable. The components 102, 104, 106, 110 of the system 100 may, for example, communicate via one or more wired and/or wireless connections. In some embodiments, more than one type of communication connection and/or means may be utilized. Some components 102, 104, 106, 110 of the system 100 may communicate via one or more types of hard-wired connections, for example, while other components 102, 104, 106, 110 of the system 100 may communicate utilizing one or more wireless communication protocols.

In some embodiments, the gaming device 102 may comprise a PC, laptop, PDA, gaming console, handheld gaming device, and/or wireless or cellular telephone. The input and output devices may comprise any type and/or configuration of input and output devices that are or become known or practicable. The gaming device 102 may, for example, comprise a gaming console such as a Nintendo® Wii™, the input device 104 may comprise a Wii™ Nunchuck Controller connected (wired and/or wirelessly) to the gaming device 102, and the output device 106 may comprise a TV or other monitor. In some embodiments, the input device 104 and/or the output device 106 may comprise a plurality of devices, components, and/or portions. The input device 102 may, for example, comprise a Wii™ Nunchuck Controller as well as a Wii™ Remote, while the output device 106 may comprise a DVD player, TV tuner or receiver, set-top box, TV, and/or other components coupled to output game information.

According to some embodiments, the gaming dongle 110 may comprise a device that is physically and/or communicatively coupled to the gaming device 102 to facilitate execution of a game program. The gaming dongle 110 may, for example, store value, at least a portion of which is consumed by execution of the game program by the gaming device 102. The value may, according to some embodiments, comprise credits, credit, stored cash value, tokens, and/or an amount of other consumable utilized by the game program. The value may, for example, comprise a number of balls, hits, swings, ammunition, hit points, energy, and/or time that may be utilized by a player of a game associated with execution of the game program. The gaming dongle 110 may also or alternatively (i) store and/or determine a gaming signature of a player, (ii) store and/or determine biometric data of a player, and/or (iii) store and/or determine GPS data associated with the gaming dongle 110 (and/or with the gaming device 102).

The game program may be stored, according to some embodiments, by the gaming device 102 (e.g., such as in the case that the gaming device 102 is intended to only be operable to play a limited number of games, or in the case that the gaming device is a PC-like device upon which game programs are loaded as desired), by a separate game disk and/or cartridge (e.g., a 'floppy' disk or a game console cartridge), and/or by the gaming dongle 110. In some embodiments, the game program may be stored, at least partially, in a plurality of locations. In a client-server configuration, for example, the gaming device 102 may store a 'front-end' and/or a minimal portion of the game program, for example, while the remainder of the game program may be stored on a separate disk, server, and/or device (e.g., on the gaming dongle 110). According to some embodiments, a portion of the game program may be stored on the gaming dongle 110. In some embodiments, the entire game program may be stored on the gaming dongle 110.

B. Gaming Dongle

Figure 2:
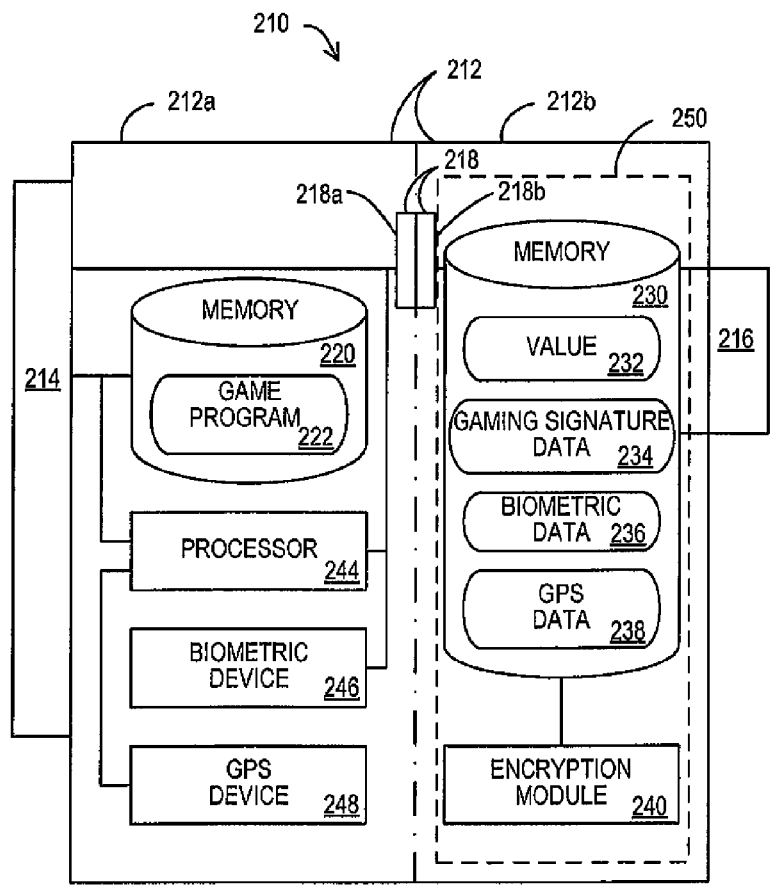
FIG. 2 is a block diagram of a gaming dongle according to some embodiments.

Turning now to FIG. 2, a block diagram of a gaming dongle 210 according to some embodiments is shown. In some embodiments, the gaming dongle 210 may be similar in configuration and/or functionality to the gaming dongle 110 of FIG. 1. The gaming dongle 210 may comprise, for example, a casing 212 (which may include a first portion 212a and a second portion 212b) enclosing and/or housing one or more of a first connector 214, a second connector 216, a joining connector 218 (which may include a first joining connector 218a and a second joining connector 218b), a first memory 220 storing a game program 222, and/or a second memory 230 storing one or more of (i) a value 232, (ii) gaming signature data 234, (iii) biometric data 236, and/or (iv) GPS data 238. The gaming dongle 210 may also or alternatively, comprise an encryption module 240, a processor 244, a biometric device 246, and/or a GPS device 248. According to some embodiments, the gaming dongle 210 may be configured to perform and/or facilitate processes in accordance with embodiments described herein. The gaming dongle 210 may, for example, be utilized to store value 232 utilized to play a game associated with execution of the game program 222 and/or to store gaming signature data 234, biometric data 236, and/or GPS data 238 to utilize in verification of game and/or tournament results.

In some embodiments, the casing 212 may be constructed of any suitable material such as plastic, resin, rubber, metal, or any combinations thereof. The casing 212 may, for example, comprise an injection-molded plastic housing similar to those utilized for common USB memory sticks, thumb drives, and/or micro-drive storage devices. In some embodiments, the casing 212 may comprise a plurality of portions, such as the first portion 212a and the second portion 212b shown in FIG. 2. According to some embodiments, the first and second portions 212a-b may be separable. In some embodiments, the first and second portions 212a-b may be reengaged and/or reversibly separable. In the case that the first and second portions 212a-b are coupled via the joining connectors 218a-b, and the joining connectors 218a-b are configured as USB or other male-female couplings, the first and second portions 212a-b may be engaged and/or coupled and disengaged and/or de-coupled as desired (e.g., by engaging and disengaging the first and second joining connectors 218a-b, respectively). In the case that the first and second portions 212a-b are coupled via a substantially irreversibly separable link (e.g., one or more thin pieces of plastic; the joining connectors 218a-b), once the first and second portions 212a-b are de-coupled and/or separated (e.g., torn apart), reattachment and/or re-coupling becomes substantially impractical. A substantially irreversible separation may, in some embodiments, comprise a separation of a type such that an adhesive and/or other bonding agent or fastening device would be required to re-couple the first and second portions 212a-b of the casing 212. These various configurations of the casing 212 and/or the plurality of portions 212a-b thereof may be advantageously utilized to implement various methods as described herein.

The connectors 214, 216, 218 described herein may generally comprise any type and/or configuration of connectors that are or become known or practicable. As used herein the term "connector" may generally refer to male, female, and/or a combination of male and female connector types. The connectors 214, 216, 218 may include, for example, one or more pins and/or other protruding electrical contacts (a male connector) or one or more pin and/or electrical contact receptors, indentations, and/or holes (a female connector); none of which are explicitly shown in FIG. 2. According to some embodiments, the connectors 214, 216, 218 may comprise, for example, one or more electro-mechanical connectors that provide both physical and electrical coupling, such as connectors constructed in compliance with and/or to permit transmission of signals in accordance with (i) the USB interface standard as described in the USB Specification Revision 2.0 (2000), (ii) the Peripheral Component Interconnect (PCI) interface standard as defined by the PCI Special Interest Group (SIG) in "PCI Local Bus Specification Revision 2.2" (Dec. 18, 1998), (iii) the PCI Express interface standard such as that defined by the PCI Express Base Specification 1.0a, 1394 such as that defined by IEEE 1394B-2002 Standard for Higher Performance Serial-Bus Amendment 2 (2002), and/or (iv) the Category 5-e (Cat5e) Cabling standard as described by the American Standards Institute/Telecommunications Industry Association/Electronic Industries Alliance (ANSI/TIA/EIA) 568-A-5 addendum (February 2000). According to some embodiments, the layout, spacing, arrangement, and/or any other electrical contact associated with the connectors 214, 216, 218 may be determined based on the specifications of the signal and/or signals desired for transmission through the connectors 214, 216, 218. For example, one or more pins or other contacts of the connectors 214, 216, 218 may be arranged in accordance with the transmission requirements defined in one or more of the specifications for the signals listed above.

The first connector 214, for example, may comprise a male USB connector operable to be inserted into a female USB port/receptacle of a gaming device (such as the gaming device 102 of FIG. 1) and operable to transmit signals in accordance with the USB 2.0 standard between the gaming device and the gaming dongle 210. In some embodiments, the second connector 216 and/or the joining connectors 218 may also or alternatively comprise USB connectors. In some embodiments, one or more of the connectors 214, 216, 218 may comprise wireless transmission and/or communication devices such as a transceiver operable to send and receive signals in accordance with (i) the "Information Technology—Telecommunications And Information Exchange Between Systems—Local And Metropolitan Area Networks" standard 802.11b-1999® published by the Institute of Electrical and Electronics Engineers (IEEE), (ii) the Wireless LAN (WLAN) transmission standard 802.11b/g-1999/2003® published by the IEEE, and/or (iii) the WLAN standard 802.11h-2003 published by the IEEE. The second connector 216 may comprise a wireless receiver operable to wirelessly receive indications pertaining to replenishing the value 232, for example. In some embodiments, the joining connectors 218a-b may also or alternatively comprise one or more wireless transceivers operable to exchange information between the first and second portions 212a-b of the casing 212. In such an embodiment, physical coupling between the first and second portions 212a-b of the casing 212, if desired, may be accomplished via one or more magnetic and/or ferrous portions (not explicitly shown in FIG. 2) of the first and second portions 212a-b.

In some embodiments, such as in the case that the first and second portions 212a-b of the casing 212 are operable to be snapped-off, pulled or twisted apart, and/or otherwise substantially irreversibly separated, the joining connectors 218a-b may also be substantially irreversibly separated, or even substantially disabled or destroyed. The joining connectors 218a-b may simply comprise one or more electrical traces, for example, that are severed upon a disjoining of the first and second portions 212a-b of the casing 212. According to some embodiments, the joining connectors 218a-b may be designed specifically to become permanently disabled upon a disjoining of the first and second portions 212a-b of the casing 212.

The first memory 220 and the second memory 230 may, according to some embodiments, comprise any type and/or configuration of data storage devices that are or become known or practicable. The memories 220, 230 may, for example, include any appropriate combination of magnetic, optical and/or semiconductor memory, including, but not limited to one of, or any combination of: (i) RAM; (ii) Dynamic RAM (DRAM); (iii) embedded DRAM (eDRAM); (iv) Static RAM (SRAM); (v) ferroelectric RAM (FeRAM); (vi) magneto-resistive RAM (MRAM); (vii) phase-change RAM (PRAM); (viii) resistive RAM (RRAM); (ix) Nano-RAM (NRAM); (x) zero-capacitor RAM (Z-RAM); (xi) twin-transistor RAM (TTRAM); (xii) Read-Only Memory (ROM); (xiii) programmable ROM (PROM) or field-programmable ROM (FPROM); (xiv) electrically erasable PROM (EEPROM); (xv) flash memory; and/or (xvi) Semiconductor-Oxide-Nitride-Oxide-Semiconductor (SONOS). In some embodiments, the memories 220, 230 may include one or more embedded processors, communication ports, CD devices, and/or hard disks. In some embodiments, the memories 220, 230 may comprise a single memory and/or memory device, disposed within either the first portion 212a or the second portion 212b of the casing 212. In some embodiments, the gaming dongle 210 may only comprise a single memory device such as the memory 230 (e.g., the first memory 220 may not be required and/or desirable in some embodiments). In the case that the game program 222 is stored in or on a device other than the gaming dongle 210 (such as the gaming device 102 of FIG. 1 and/or a separate game disk or cartridge), for example, the first memory 220 either may not be included in the gaming dongle 210, or the first memory 220 may be included, but may not store any portion of the game program 222. The first memory 220 may, according to some embodiments for example, simply comprise a flash memory operable to store information (either related to or nor related to the game program 222), similar to a standard USB memory stick device. In some embodiments, the first memory 220 may store any portion of the game program 222. The first memory 220 may, for example, store substantially the entire game program 222 or may store a fractional portion of the game program 222. According to some embodiments, the game program 222 or a portion thereof may also or alternatively be stored in the second memory 230 (although such an embodiment is not explicitly shown in FIG. 2).

In some embodiments, the second memory 230 may store the value 232, gaming signature data 234, biometric data 236, and/or GPS data 238. The second memory 230 may, for example, store the value 232 which may be utilized and or consumed by the game program 222 to execute a play session of a game. In some embodiments, the value 232 may be replenished, recharged, and/or otherwise altered (even depleted if desired), such as in the case that the second memory 230 receives one or more signals via the second connector 216. The second memory 230 may also or alternatively store gaming signature data 234. In the case that a player's gaming signature is determined (such as by the gaming device 102 of FIG. 1 and/or by the processor 244), for example, data indicative of the gaming signature may be stored in the second memory 230. In some embodiments, such data 234 may comprise data utilized to determine a gaming signature of a player. The second memory 230 may also or alternatively store either or both of biometric data 236 and GPS data 238. The biometric data 236 may be provided by the biometric device 246, for example, while the GPS 238 data may be provided by the GPS device 248. In some embodiments, any or all of the gaming signature data 234, the biometric data 236, and/or the GPS data 238 may be utilized to verify and/or facilitate verification of game results associated with an execution of the game program 222. Some or all of the data 232, 234, 236, 238 stored by the second memory 230 may also or alternatively be stored in the first memory 220 (although such an embodiment is not explicitly shown in FIG. 2).

In some embodiments, a single combined memory (e.g., comprising a combination of the first and second memories 220, 230; not explicitly shown in FIG. 2) and/or the second memory 330 may reside within a secure perimeter 250. The secure perimeter 250 may generally comprise any structure, code (including microcode), firmware, and/or device that is operable to prevent, hinder, thwart, and/or allow identification of tampering with the gaming dongle 210 (and/or the second portion 212b of the casing 212 or the secure perimeter 250). Examples of various implementations of a secure perimeter are described at length in U.S. Pat. No. 5,970,143, such concepts and description of which are hereby incorporated by reference herein.

In some embodiments, the secure perimeter 250 may be configured to protect the value 232. In the case that the value 232 is associated with cash value, for example, it may be desirable to ensure that the value 232 is not compromised (e.g., to prevent fraud, undue enrichment, and the like). Similarly, in the case that one or more of the gaming signature data 234, the biometric data 236, and/or the GPS data 238 are utilized to verify game results (particularly in the case where the game results may qualify a player for a prize of value), such data may be stored within and/or be otherwise protected by the secure perimeter 250. According to some embodiments, such as in the case that the encryption module 240 (which may include encryption and/or decryption capabilities) is included in the gaming dongle 210 to encrypt and/or encode any of the data 232, 234, 236, 238 stored in the secure perimeter 250, the encryption module 240 may itself be protected by and/or included within the secure perimeter 250 (e.g., as shown in FIG. 2), to further protect and/or secure any encryption data and/or algorithms that may be utilized by the encryption module 240. The encryption module 240 may itself comprise any type and/or configuration of encryption, decryption, encoding, and/or decoding device, code, and/or firmware that is or becomes known or practicable. Examples of the encryption module 240 are described in more detail in U.S. Pat. No. 5,970,143, such concepts and description of which are hereby incorporated by reference herein.

In some embodiments, the secure perimeter 250 may include other or alternative components of the gaming dongle 210 (e.g., the secure perimeter 250 may be configured other than shown in FIG. 2). The secure perimeter 250 may, for example, also or alternatively protect the first memory 220 and/or the game program 222 (or any portions thereof). In some embodiments, the secure perimeter 250 may be substantially disposed within and/or comprise the second portion 212b of the casing 212 (e.g., as shown in FIG. 2). Such a configuration may (particularly in embodiments where the second portion 212b of the casing 212 is substantially irreversibly separable from the first portion 212a), for example, facilitate and/or ease manufacturing, facilitate and/or ease separation of the first and second portions 212a-b of the casing 212, and/or reduce costs associated with the first portion 212a of the casing 212 of the gaming dongle 210 (e.g., since the first portion 212a may not require the secure perimeter 250, the first portion 212a may be less expensive to manufacture, produce, and/or distribute).

According to some embodiments, the gaming dongle 210 may comprise various components utilized to receive, sense, gather, procure, process, and/or otherwise determine any of the data 232, 234, 236, 238 stored within the second memory 230. In embodiments where gaming signature data 234 is stored in the gaming dongle 210, for example, the processor 244 may be utilized to determine and/or process such data 234. In some embodiments, based on various inputs and/or actions associated with a player's play of a gaming session (e.g., made possible by execution of the game program 222) the processor 244 may compute and/or otherwise determine a gaming signature of the player, and may provide the gaming signature data 234 to the second memory 230 as an indication of the determined gaming signature. According to some embodiments, the processor 244 may make such determinations by executing instructions stored in a memory (not explicitly shown in FIG. 2), such as either or both of the first and second memories 220, 230. In some embodiments, the processor 244 may be entirely or partially disposed within a gaming device (such as the gaming device 102 of FIG. 1) and/or within a peripheral device (not shown in either of FIG. 1 or FIG. 2). The determination of the player's gaming signature and/or of the gaming signature data 234, for example, may be accomplished by a gaming device in communication with the gaming dongle 210 (e.g., via the first connector 214).

According to some embodiments, the gaming dongle 210 may also or alternatively comprise the biometric device 246, which may be or include any type and/or configuration of biometric device that is or becomes known or practicable. The biometric device 246 may, for example, comprise an optical and/or ultrasonic fingerprint and/or thumbprint reader or scanner and/or a processing device to create a biometric template of a fingerprint/thumbprint scan. In some embodiments, the biometric device 246 may be associated with and/or comprise the processor 244. The processor 244 may be operable to process scans received from the biometric device 246, for example, such as by executing one or more pattern-based and/or minutia-based algorithms (e.g., that may be stored in either or both of the memories 220, 230). In some embodiments, the processor 244 may itself be considered a "biometric device", at least because the determination of gaming signatures may be considered a determination of a "behavioral biometric".

According to some embodiments, the gaming dongle 210 may also or alternatively comprise the GPS device 248, which may be or include any type and/or configuration of location determination and/or GPS device that is or becomes known or practicable. The GPS device 248 may generally, for example, comprise a GPS receiver operable to determine a location associated with the gaming dongle 210. The term "GPS" is utilized herein for exemplary purposes to describe any type and/or configuration of location determination means. A GPS device in accordance with embodiments herein may, for example, comprise any type of Global Navigation Satellite System (GNSS) device such as a GPS device, a European Union Galileo positioning system device, a Russian Global Navigation Satellite System (GLONASS) device, a Chinese Beidou Satellite Navigation and Position System device, a French Doppler Orbitography and Radio-positioning Integrated by Satellite (DORIS) device, and/or an Indian Regional Navigational Satellite System (IRNSS) device, a Decca Navigation System device, a Long Range Navigation (LORAN) System device, an Alpha (RSDN-20) and/or Omega Navigation System device, an enhanced 911 (E911) cellular service device, a Personal Locator Beacon (PLB) device, one or more signal triangulation devices, and/or any combination thereof.

In embodiments where the game program 222 is stored by the gaming dongle 210 and/or executed by a gaming device utilizing the gaming dongle 210, a determination, by the GPS device 248 of a location of the gaming dongle 210 may be representative of a location where the game program 222 is executed (e.g., and where a game played in response thereto is therefore played). In some embodiments, GPS data 238 may be determined by the GPS device 248 and then utilized, for example, to determine if a play of the game occurred at an acceptable location. Game results, particularly for tournaments and/or online tournaments, for example, may not be valid if the game is played on school grounds (e.g., during school hours), outside of a particular area and/or jurisdiction, and/or in one or more other unauthorized areas (e.g., in too close a proximity to other game players).

Although FIG. 2 illustrates communication paths and/or connections between various components of the gaming dongle 210, any orientation and/or configuration of communication paths that is or becomes desirable and/or practicable may be implemented in the gaming dongle 210 without deviating from the embodiments described herein. While the encryption module 240 is shown in direct communication only with the second memory 230, for example, the encryption module 240 may instead (or also) be in direct or indirect communication with any of the first memory 220, the processor 244, the biometric device 246, the GPS device 248, and/or the first and second connectors 214, 216. The encryption module 240 may, for example, encrypt and/or encode (i) gaming signature data 234 output by the processor 244, (ii) biometric data 236 output by the biometric device 246, and/or (iii) GPS data 238 output by the GPS device 248. Fewer or more components that are shown in FIG. 2 may also or alternatively be incorporated into the gaming dongle 210.

Figure 3:
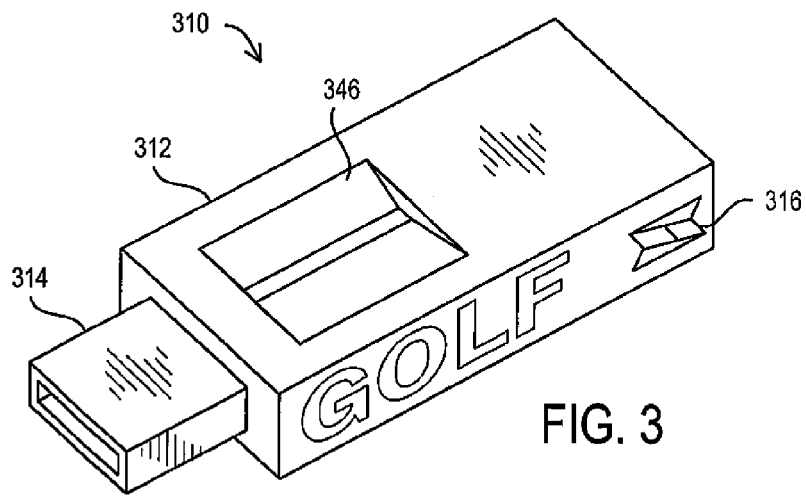
FIG. 3 is a perspective diagram of a gaming dongle according to some embodiments.

Turning now to FIG. 3, a perspective diagram of a gaming dongle 310 according to some embodiments is shown. In some embodiments, the gaming dongle 310 may be similar in configuration and/or functionality to any of the gaming dongles 110, 210 of FIG. 1 and/or FIG. 2 herein. The gaming dongle 310 may comprise, for example, a casing 312 enclosing and/or housing a first connector 314, a second connector 316, and/or a biometric device 346. According to some embodiments, the components 312, 314, 316, 346 of the gaming dongle 310 may be similar in configuration and/or functionality to the similarly named and/or numbered components described in reference to FIG. 1 and/or FIG. 2 herein. The gaming dongle 310 may be configured, for example, to perform and/or facilitate processes in accordance with embodiments described herein.

As shown for exemplary purposes in FIG. 3, the gaming dongle 310 may be associated with a particular game and/or type of game. As shown, for example, the gaming dongle 310 may comprise a "golf" dongle. In some embodiments, the gaming dongle 310 may store a game program (such as the game program 222 of FIG. 2) that is operable to be executed (e.g., by a gaming device such as the gaming device 102 of FIG. 1) to allow play of a golf video game. In such embodiments, the gaming dongle 310 may substantially replace a game disk, CD, DVD, and/or cartridge that gaming consoles and/or PC devices have historically utilized to execute video games. The gaming dongle 310 may, as shown in FIG. 3 for example, comprise a USB-type first connector 314 that may engaged with a USB-receptor and/or connector of a gaming device to allow the gaming device to access and execute the game program (e.g., to execute the golf video game).

In some embodiments, the gaming dongle 310 may also or alternatively store value (such as the value 232 of FIG. 2). The value may generally comprise generic or general value, such as cash equivalent (e.g., a number of cents and/or dollars) and/or a number of tokens, tickets, or credits. The value may also or alternatively comprise game-specific value such as a number of golf balls, a number of strokes, a number or type of golf clubs, a number of holes or courses, etc. According to some embodiments, the value may be replenished, recharged, loaded, and/or otherwise modified (e.g., depleted or removed) via one or more signals transmitted via the second connector 316. The second connector 316 may, as shown in FIG. 3 for example, be configured as a female connector receptor that is operable to receive a connector (not shown) from another device (also not shown). In such a manner, for example, the other device may send signals to the gaming dongle 310 and/or directly into a memory or secure perimeter (such as the memories 220, 230 and/or the secure perimeter 250 of FIG. 2; none of which are shown explicitly in FIG. 3) of the gaming dongle 310 to alter the value stored therein. In some embodiments, the second connector 316 may be configured as a proprietary connector such that only authorized devices, such as a Point-Of-Sale (POS) device or other device operated by a commercial entity, may interface with the gaming dongle 310 to alter the value.

According to some embodiments (such as shown in FIG. 3), the gaming dongle 310 may comprise a biometric device 346. The biometric device 346 may, for example, comprise a fingerprint scanner that is operable to gather information from a player's finger swiped over the biometric device 346. In some embodiments, the biometric device 346 may interface with various components within the gaming dongle 310 to secure, encrypt, decrypt, and/or allow access to information stored within the gaming dongle 310. In some embodiments, the biometric device 346 may be utilized to allow execution of the golf video game program. In other words, the golf video game may only execute for certain players that are authorized to play the game. Such players may, for example, be registered as authorized at a time and/or place of purchase of the gaming dongle 310, or may be registered pursuant to a setup routine executed the first time the gaming dongle 310 is interfaced with (e.g., inserted into a port of) a gaming device. According to some embodiments, the biometric device 346 may be utilized to capture player biometric data that is then stored and later utilized to verify that a player attempting to submit and/or certify game results (e.g., a low scoring golf game result) is the same player that achieved the game results.

Figure 4:
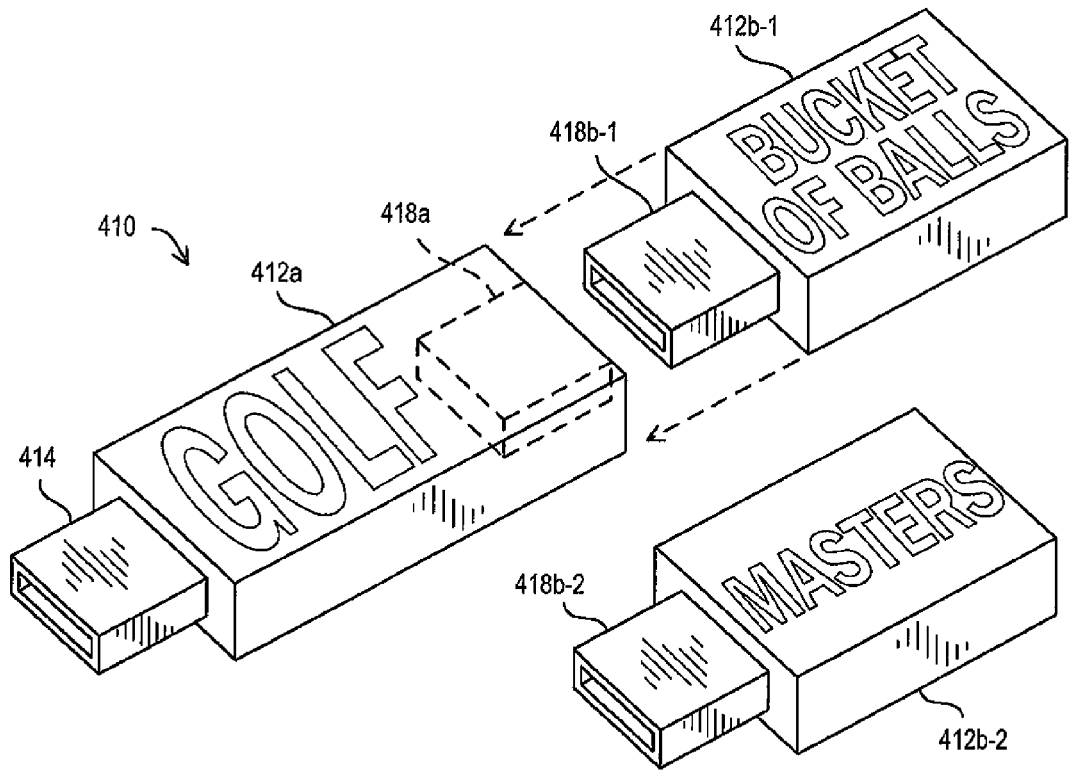
FIG. 4 is a perspective diagram of a gaming dongle according to some embodiments.

Referring now to FIG. 4, a perspective diagram of a gaming dongle 410 according to some embodiments is shown. In some embodiments, the gaming dongle 410 may be similar in configuration and/or functionality to any of the gaming dongles 110, 210, 310 of FIG. 1, FIG. 2, and/or FIG. 3 herein. As shown in FIG. 4, the gaming dongle 410 may comprise a two-piece dongle (e.g., as opposed to the one-piece dongle 310 shown in FIG. 3). The gaming dongle 410 may comprise, for example, a casing 412 that comprises a first portion 412a and one of a plurality of second portions 412b-1, 412b-2. In some embodiments, such as shown in FIG. 4, the first portion 412a may comprise a first connector 414 (e.g., for connecting to a gaming device) and a first joining connector 418a. The second portions 412b-1, 412b-2 may, according to some embodiments, be removably coupled to the first portion 412a (and/or the first joining connector 418a thereof) via second joining connectors 418b-1, 418b-2. As shown in FIG. 4, any or all of the first connector 414 and the joining connectors 418b-1, 418b-2 may comprise USB-type male and/or female electromechanical connectors. As described herein, any other and/or alternative form of connector may be utilized without deviating from the scope of embodiments described herein. In some embodiments, different connector types may be utilized for any or all of the connectors 414, 416, 418a, 418b-1, 418b-2. According to some embodiments, the components 412, 412b-1, 412b-2, 414, 418a, 418b-1, 418b-2 of the gaming dongle 410 may be similar in configuration and/or functionality to the similarly named and/or numbered components described in reference to FIG. 1, FIG. 2, and/or FIG. 3 herein. The gaming dongle 410 may be configured, for example, to perform and/or facilitate processes in accordance with embodiments described herein.

For example, the first portion 412a of the gaming dongle 410 may store a game program operable to facilitate execution of a golf video game (continuing the example from FIG. 3), such as by coupling the first connector 414 to a port of a gaming device (such as the gaming device 102 of FIG. 1). In some embodiments, play of the golf video game may be achieved by utilizing the first portion 412a of the gaming dongle 410 in conjunction with a gaming device. According to some embodiments, however, the "bucket of balls" second portion 412b-1 of the gaming dongle 410 may store a value that is required to execute play of the golf video game. As indicated by the name assigned to the "bucket of balls" second portion 412b-1 of the gaming dongle 410, for example, the "bucket of balls" second portion 412b-1 may store an indication representing a number of golf balls.

In some embodiments, the golf video game may be executed in the absence of the "bucket of balls" second portion 412b-1, but the player of the golf game may, in such a case, not have any balls to hit, and may effectively therefore, not be able to play the golf video game. Upon a coupling of the "bucket of balls" second portion 412b-1 to the first portion 412a (e.g., utilizing the first joining connector 418a and the "bucket of balls" joining connector 418b-1), the player may be provided with a number of golf balls to play with in the golf video game, and may therefore be able to effectively participate in and play the golf video game. In some embodiments, the "bucket of balls" second portion 412b-1 may alternatively be coupled between the gaming device and the first portion 412a of the gaming dongle 410. The "bucket of balls" joining connector 418b-1 may couple to the gaming device, for example, and the first connector 414 may couple to a joining connector disposed on the opposing end of the "bucket of balls" second portion 412b-1 (not shown; e.g., that may be configured similar to the first joining connector 418a). According to some embodiments, other dongle portions such as the "Masters" second portion 412b-2 may also be coupled to the first portion 412a, such as via a coupling of the first joining connector 418a and the "Masters" second joining connector 418b-2. In such a manner, for example, multiple dongle portions 412a, 412b-1, 412b-2 may be coupled and/or utilized in a chain configuration.

In some embodiments, the value (e.g., the number of golf balls) may be consumed, at some rate, by execution of the golf video game program. Every time the player loses a golf ball by hitting it off the golf course, for example, a golf ball may be deducted from the value stored in the "bucket of balls" second portion 412b-1 of the gaming dongle 410. At some point, the value/number of golf balls may be depleted via play of the golf video game. According to some embodiments, the value stored in the "bucket of balls" second portion 412b-1 of the gaming dongle 410 may then be replenished, such as by taking the "bucket of balls" second portion 412b-1 of the gaming dongle 410 to a retailer and paying to have more golf balls added to the stored value. Adding, replenishing, and/or storing value may generally be accomplished at any time, and in some embodiments, is not limited to the case when the value becomes entirely depleted. A player may, for example, add twenty (20) golf balls to the "bucket of balls" second portion 412b-1 of the gaming dongle 410 when an original value of one hundred (100) golf balls is not yet depleted, or has only been depleted by ten (10) balls. Although the value stored in the "bucket of balls" second portion 412b-1 of the gaming dongle 410 is described and shown as being a game-specific value (e.g., a number of golf balls), the value may also or alternatively comprise a generic cash and/or other value, such as a number of credits. In such a manner, for example, the "bucket of balls" second portion 412b-1 of the gaming dongle 410 could be utilized to provide value for play of a variety of games (e.g., be operable to interface with a plurality of different first portions 412a), and presumably would be labeled differently in such embodiments (e.g., the "bucket of balls" second portion 412b-1 of the gaming dongle 410 may instead be labeled "gaming credits").

In some embodiments, the golf video game may be entirely executed without requiring a connection to any second portion 412b-1, 412b-2. The first portion 412a may substantially function, for example, as a game 'stick'. A second portion 412b-1, 412b-2 may be required in such embodiments, however, for a player to participate in a tournament associated with the golf game. In some embodiments, for example, the "Masters" second portion 412b-2 may be coupled to the first portion 412a (e.g., utilizing the first joining connector 418a and the "Masters" joining connector 418b-2), to allow a player to play the golf video game in tournament mode. In other words, the "Masters" second portion 412b-2 may store information (e.g., a value) that permits the game program to be executed in a different mode and/or the "Masters" second portion 412b-2 may simply allow golf video game result information to be stored in a verifiable manner so that the player may enter such results into a tournament. The "Masters" second portion 412b-2 may, for example, be configured to store golf video game results as well as various verification information as described herein, such as gaming signature data, biometric data, and/or GPS data. According to some embodiments, the "Masters" second portion 412b-2 may then, for example, be turned into a gaming authority and/or taken to a retail or other establishment (such as a gaming tournament kiosk) to provide the verifiable game results (and other stored info) and thereby enter the "Masters" tournament. In some embodiments, such a tournament entry second portion 412b-2 may be limited to a number of uses, such as a single use.

Figure 5A:
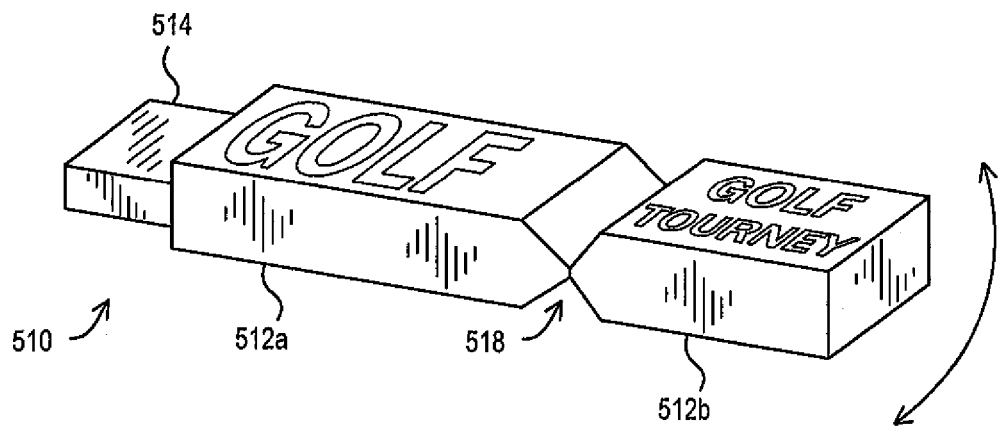
FIG. 5A and FIG. 5B are perspective diagrams of a gaming dongle according to some embodiments.
Figure 5B:
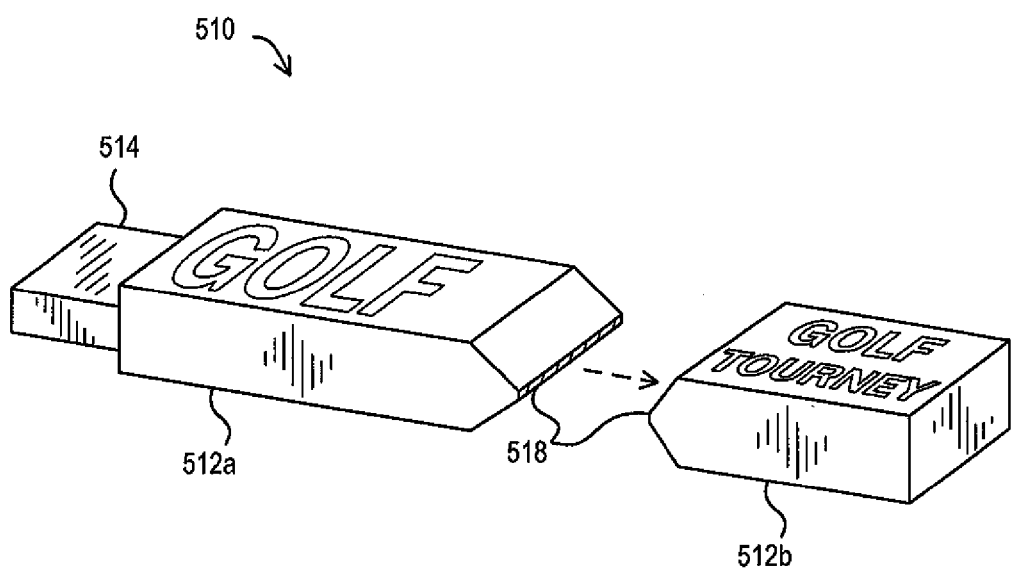

Turning to FIG. 5A and FIG. 5B, for example, perspective diagrams of a gaming dongle 510 according to some embodiments are shown. In some embodiments, the gaming dongle 510 may be similar in configuration and/or functionality to any of the gaming dongles 110, 210, 310, 410 of FIG. 1, FIG. 2, FIG. 3, and/or FIG. 4 herein. As shown in FIG. 5A and FIG. 5B, the gaming dongle 510 may comprise a two-piece dongle that is configured to be substantially irreversible separable (e.g., as opposed to the two-piece dongle 410 shown in FIG. 4 that is reversibly separable). The gaming dongle 510 may comprise, for example, a first casing portion 512a and a second casing portion 512b. In some embodiments, such as shown in FIG. 5A and FIG. 5B, the first portion 512a may comprise a first connector 514 (e.g., for connecting to a gaming device) and the first and second portions 512a, 512b may be removably coupled via a joining connector 518. According to some embodiments, the components 512a, 512b, 514, 518 of the gaming dongle 510 may be similar in configuration and/or functionality to the similarly named and/or numbered components described in reference to FIG. 1, FIG. 2, FIG. 3, and/or FIG. 4 herein.

The joining connector 518 may, according to some embodiments, comprise a thin connecting strip of plastic that is operable, upon introduction of a stress, such as a bending stress applied as shown by the arrow in FIG. 5A, to snap, tear, and/or break, such that the first casing portion 512a and the second casing portion 512b become separated. In some embodiments, at least because the joining connector 518 may snap, tear, and/or break upon introduction of an appropriately applied stress, upon separation, the joining connector 518 may become substantially unusable, at least with respect to coupling or re-coupling the first and second casing portions 512a, 512b. According to some embodiments, the joining connector 518 may comprise one or more perforations, indentations, and/or other features (none of which are explicitly shown by FIG. 5A or FIG. 5B) configured to facilitate separation of the first and second casing portions 512a, 512b. In some embodiments, the joining connector 518 may also or alternatively be configured to be severed, such as by utilization of a utility knife or pair of scissors (e.g., the plastic and/or other material bridge between the first and second casing portions 512a, 512b may be designed to be thicker to help prevent unintended separations). According to some embodiments, the shapes of the first and second casing portions 512a, 512b may also or alternatively be beveled (e.g., as shown in FIG. 5A and FIG. 5B) to facilitate application of a bending stress as indicated by the arrow in FIG. 5A.

In some embodiments, the gaming dongle 510 may be utilized to play a game (such as a golf video game, continuing the example from FIG. 3 and FIG. 4) and a result of the game may be stored in a memory within the second casing portion 512b. The second casing portion 512b may comprise, for example, a secure perimeter. The second casing portion 512b may also store verification information such as gaming signature data, biometric data, GPS data, and/or other data or codes that may be utilized to verify the stored game results. As described in U.S. Pat. No. 5,970,143, for example, a hash value and/or other information utilized to verify either or both of the game result and the game program may be stored. Such concepts and descriptions of which are hereby incorporated by reference herein. In some embodiments, such information may be stored in the second casing portion 512b while it remains attached to the first casing portion 512a (such as shown in FIG. 5A). This may, for example, comprise a configuration of the gaming dongle 510 as purchased by a game player and/or other consumer.

In some embodiments, the second casing portion 512b may be separated and/or severed from the first casing portion 512a (such as shown in FIG. 5B). Once a game result (or plurality or set of game results) is stored in the second casing portion 512b, for example, the second casing portion 512b may be redeemed for entry into a tournament, sweepstakes, and/or other competition. For game results to qualify a player for a prize, for example, the second casing portion 512b may have to be returned and/or provided to an entity such as an entity associated with a particular tournament and/or game. The second casing portion 512b may be mailed to and/or handed-in in person to a retail store and/or collection facility, for example, such that the player's game results (and any attendant verification information) may be provided to the entity running the tournament (e.g., the "golf tourney"). In some embodiments, once the second casing portion 512b is separated and/or severed from the first casing portion 512a, the gaming dongle 510 may not again be usable for tournament play. A player may purchase the gaming dongle 510 as a game 'stick', for example that comes with a one-shot or single attempt tournament feature. According to some embodiments, the golf video game may continue to be played even after separation of the second casing portion 512b.

Figure 6A:
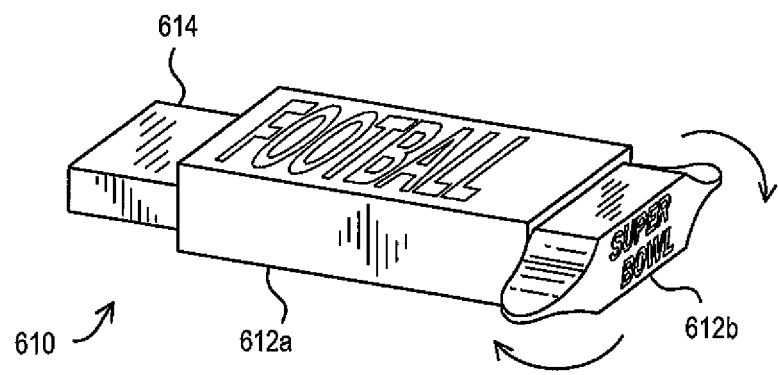
FIG. 6A and FIG. 6B are perspective diagrams of a gaming dongle according to some embodiments.
Figure 6B:
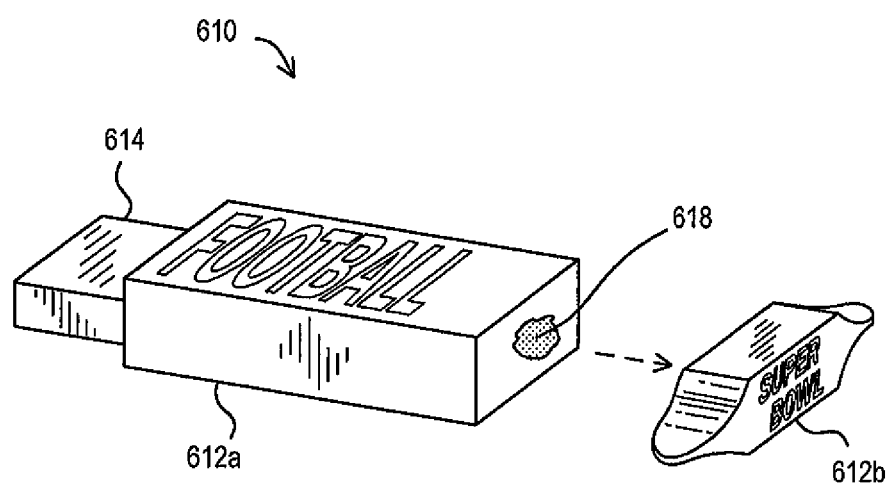

Turning to FIG. 6A and FIG. 6B, perspective diagrams of a gaming dongle 610 according to some embodiments are shown. In some embodiments, the gaming dongle 610 may be similar in configuration and/or functionality to any of the gaming dongles 110, 210, 310, 410, 510 of FIG. 1, FIG. 2, FIG. 3, FIG. 4, FIG. 5A, and/or FIG. 5B herein. As shown in FIG. 6A and FIG. 6B, the gaming dongle 610 may comprise a two-piece dongle that is configured to be substantially irreversible separable (e.g., similar to the two-piece dongle 510 shown in FIG. 5A and FIG. 5B). The gaming dongle 610 may comprise, for example, a first casing portion 612a and a second casing portion 612b. In some embodiments, such as shown in FIG. 6A and FIG. 6B, the first portion 612a may comprise a first connector 614 (e.g., for connecting to a gaming device) and the first and second portions 612a, 612b may be removably coupled via a joining connector 618. According to some embodiments, the components 612a, 612b, 614, 618 of the gaming dongle 610 may be similar in configuration and/or functionality to the similarly named and/or numbered components described in reference to FIG. 1, FIG. 2, FIG. 3, FIG. 4, FIG. 5A, and/or FIG. 5B herein.

FIG. 6A and FIG. 6B illustrate an exemplary gaming dongle 610 that is ergonomically configured for ease of separation of the first and second casing portions 612a, 612b. While the gaming dongle 510 of FIG. 5A and FIG. 5B is illustrated as being configured to accept a bending force operable to separate the first and second casing portions 512a, 512b, for example, the second casing portion 612b of the gaming dongle 610 of FIG. 6A and FIG. 6B is illustrated as being configured to facilitate application of a rotational and/or torsion force that may cause separation of the first and second casing portions 612a, 612b. The second casing portion 612b may be rotated or twisted in accordance with the arrows shown in FIG. 6A, for example, to apply a torsion and/or rotational force (e.g., a rotational and/or torsion shear force) that is operable to snap, tear, and/or break the joining connector 618 (e.g., which may comprise a breakable adhesive coupling, fastener, and/or material bridge). In some embodiments not shown explicitly in FIG. 6A or FIG. 6B, the rotational de-coupling of the first and second casing portions 612a, 612b may be advantageously implemented as a reversible separation by having the joining connector 618 comprise a threaded connector that may be screwed and un-screwed as desired. In such embodiments, the joining connector 618 may also form an electrical coupling, such as in the case that the threaded connector is made of conductive materials such as metal (or otherwise comprise one or more electrical traces or contacts).

As shown in FIG. 6A and FIG. 6B, the gaming dongle 610 may be associated with a game other than golf, such as "football". In such embodiments, the second casing portion 612b may be complimentarily associated with a "football" related event such as a "super bowl". This may represent, for example, a "super bowl" tournament that may be entered into by a player of the "football" game (e.g., by playing the game to store results and/or verification data the second casing portion 612b, and then twisting-off the second casing portion 612b, as shown in FIG. 6B, for redemption). In some embodiments, the second "super bowl" casing portion 612b may include data unique to the tournament. The second "super bowl" casing portion 612b may store, for example, one or more game parameter values, special capabilities, graphics (logos, scenery, playing fields, jersey graphics, etc.), sounds, etc., that the standard "football" game may not otherwise include. Such an embodiment may be particularly advantageous in the case that the first and second casing portions 612a, 612b are reversibly separable. In such an embodiments, for example, a player may purchase, rent, or borrow different second casing portions 612b that each allow the player to access different maps, fields, levels, capabilities, etc., within the game play as executed in accordance with the game program associated with the first casing portion 612a.

C. Gaming Dongle System

Figure 7:
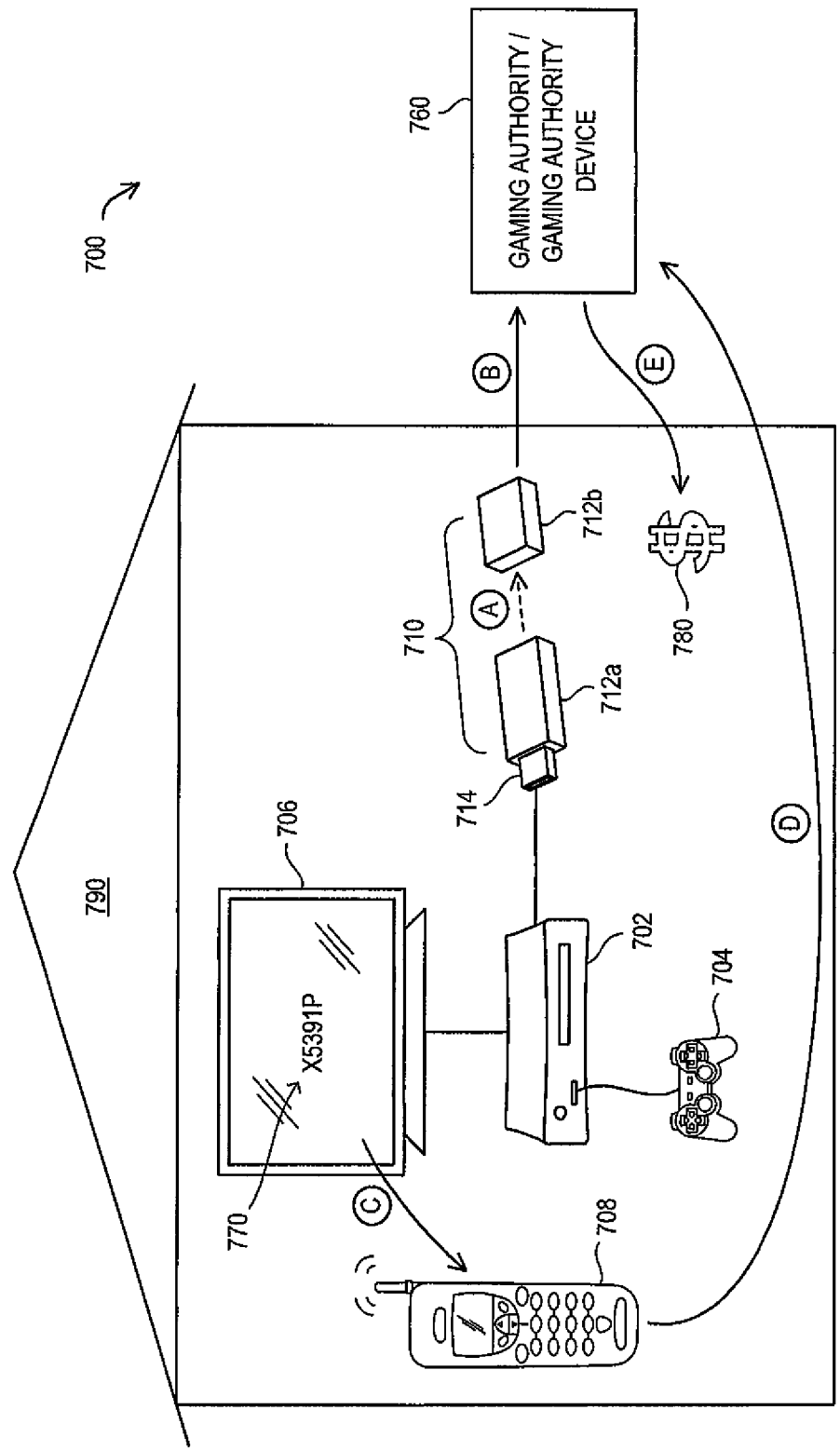
FIG. 7 is a diagram of a gaming dongle system according to some embodiments.

Turning to FIG. 7, a diagram of a gaming dongle system 700 according to some embodiments is shown. In some embodiments, the gaming dongle system 700 may comprise a gaming device 702, an input device 704, a display device 706, a telephone device 708, and/or a gaming dongle 710. The gaming dongle 710 may comprise, for example, a first connector 714, a first casing portion 712a, and/or a second casing portion 712b. In some embodiments, the gaming dongle 710 may be similar in configuration and/or functionality to any of the gaming dongles 110, 210, 310, 410, 510, 610 of FIG. 1, FIG. 2, FIG. 3, FIG. 4, FIG. 5A, FIG. 5B, FIG. 6A, and/or FIG. 6B herein. In some embodiments, the gaming dongle system 700 may also or alternatively comprise a gaming authority device 760.

The gaming dongle 710 may, in some embodiments, be coupled to the gaming device 702 to execute a game program (e.g., to play a sports, racing, first-person shooter, strategy, and/or other video game). As described herein, the gaming dongle 710 may store the game program or a portion thereof (e.g., in the first casing portion 712a), or may otherwise interface with the gaming device 702 (e.g., the gaming dongle 710 may simply be utilized to store and/or verify game results). The input device 704 (illustrated as a gamepad controller in FIG. 7) may be utilized by a player to play a game in accordance with the execution of the game program and the display device 706 may generally be utilized by the gaming device 702 to provide game output to the player (e.g., graphics and/or sound). Other configurations of the gaming device 702, the input device 704, and the display device 706, are contemplated in some embodiments. Fewer or more components may, for example, be utilized to execute the game program and/or to facilitate play of the game in accordance therewith.

In some embodiments, once a player of the game achieves a result and/or set of results by playing the game, such results and/or indications thereof may be stored on the gaming dongle 710. According to some embodiments, the results and/or indications may be stored in the second casing portion 712b, which may, for example, comprise a secure perimeter. In accordance with the arrow labeled "A" in FIG. 7, the player may separate the second casing portion 712b from the first casing portion 712b of the gaming dongle 710. The separation may, for example, comprise unplugging the second casing portion 712b from the first casing portion 712a, or may comprise snapping off, breaking off, tearing off, and/or otherwise severing the second casing portion 712b from the first casing portion 712a.

In accordance with the arrow labeled "B" in FIG. 7, the second casing portion 712b may then be provided to a gaming authority and/or gaming authority device 760. The player may mail the second casing portion 712b to the gaming authority and/or gaming authority device 760, for example, or may bring the second casing portion 712b to a retail and/or other facility associated with the gaming authority and/or gaming authority device 760. While only the second casing portion 712b is illustrated as being delivered and/or provide to the gaming authority and/or gaming authority device 760 in FIG. 7, some embodiments contemplate providing the entire gaming dongle 710 (e.g., such as in the case that the gaming dongle 710 comprises a single-piece dongle).

In some embodiments, the gaming authority and/or gaming authority device 760 may comprise a POS terminal at a retail store, for example, and/or may comprise a kiosk configured to receive (and/or communicate with) the second casing portion 712b. According to some embodiments, the second casing portion 712b may then be queried by the gaming authority and/or gaming authority device 760. This may occur at a facility associated with the gaming authority and/or gaming authority device 760, for example, and/or may occur in the presence of the player (e.g., while the player waits). In some embodiments, the querying may be a simple electronic polling, interrogation, scanning, and/or communication. The second casing portion 712b may be coupled to the gaming authority and/or gaming authority device 760, for example, such as directly via a port or connection (e.g., via the second connector 216, 316 of either FIG. 2 and/or FIG. 3) and/or indirectly via a wireless communication (such as via a wireless LAN standard and/or via various inductive interrogation techniques). In some embodiments, the querying may be initiated to verify one or more of (i) the game result(s), (ii) an identity of the player (e.g., via physical and/or behavioral biometrics), (iii) a location at which the results were achieved (e.g., via GPS data), and/or (iv) a version and/or integrity of the game program.

In some embodiments, the verification may comprise receiving a code 770 from the player, the code 770 indicating that the second casing portion 712b provided by the player is associated with the first casing portion 712a (e.g., that the player presumably utilized, such as in the case that it stores a portion of the game program, to achieve the result(s)).

According to some embodiments, the first casing portion 712a and/or components therein may cause such a code 770 to be output to the player, such as by displaying the code 770 via the display device 706 (as shown in FIG. 7). In some embodiments, the code 770 may simply be emblazoned, etched, and/or otherwise indicated by the first portion of the casing 712a itself. In some embodiments, the code 770 may be revealed by the separation of the first and second casing portions 712a, 712b. The code 770 may, for example, by indicated on a portion of either of the first or second casing portions 712a, 712b that is covered and/or otherwise inaccessible until the first and second casing portions 712a, 712b are separated.

The player may then utilize the telephone device 708, in accordance with the arrow labeled "C" in FIG. 7 for example, to provide the code 770 (e.g., via the arrow labeled "D" in FIG. 7) to the gaming authority and/or gaming authority device 760. According to some embodiments, the code 770 may be utilized by the gaming authority and/or gaming authority device 760 to verify the relationship between the second casing portion 712b and the first casing portion 712a. In some embodiments, the code 770 may be utilized to verify that the gaming device 702 is the same gaming device that was utilized by the player to achieve the game result(s). Prior to the second casing portion 712b being separated from the first casing portion 712a and/or from the gaming device 702, for example, the second casing portion 712b may store and/or encrypt a code associated with the gaming device 702. The code stored and/or encrypted by the second casing portion 712b may then, for example, be compared to the code 770 provided by the gaming device 702 to the player, to verify an equivalence there between. In some embodiments, upon successful verification of any desired metrics related to the game result(s), a prize 780, such as cash and/or cash-equivalent awards, may be provided to the player. In some embodiments, such a prize 780 may be provided to the player by the gaming authority and/or gaming authority device 760 (e.g., in accordance with the arrow labeled "E" in FIG. 7). In some embodiments, the prize 780 may also or alternatively be provided by a third-party and/or third party device (not shown).

According to some embodiments, the gaming authority and/or gaming authority device 760 may query and/or prompt the player for the code 770. This may be performed via telephone and/or via the gaming device 702. In the case that the gaming device 702 is in communication with a network such as the Internet, for example, the gaming authority and/or gaming authority device 760 may query the gaming device 702 directly to determine the code 770, and/or may prompt the player, via the gaming device 702, to provide the code 770. In some embodiments, any or all of the components 702, 704, 706, 708, 710 may be located within a home 790 and/or other location or building associated with the player. In some embodiments, any GPS data associated with the game play may be required, as a prerequisite for obtaining the prize 780, to correspond to the home 790 of the player.

IV. Processes

Various embodiments will now be described with references to methods associated with some embodiments. The methods described herein may generally be performed by one or more of the systems 100, 700 and/or any of the many components and devices described herein. Other configurations of systems and devices may also or alternatively be utilized to perform the methods described herein without deviating from the scope of some embodiments.

Figure 8:
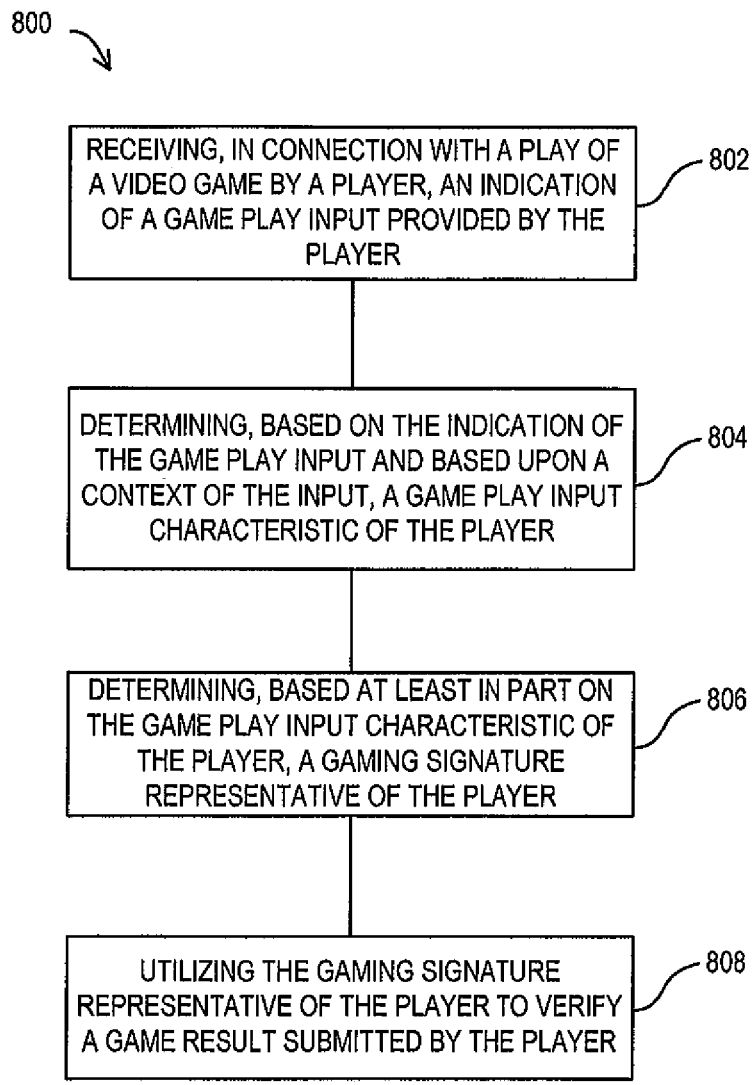
FIG. 8 is a flow diagram of a method according to some embodiments.

Turning to FIG. 8, for example, a flow diagram of a method 800 according to some embodiments is shown. The method 800 may generally comprise, for example, a method for determining a behavioral biometric, such as a gaming signature, of a player. In some embodiments, the method 800 (or portions thereof), and all other processes described herein unless expressly specified otherwise, may be performed, for example, by a gaming device 102, 702, a gaming dongle 110, 210, 310, 410, 510, 610, 710, a gaming authority device 760, and/or any combination thereof. Additionally, while some of the procedures of a process or method may be performed by a first device, other steps may be performed by another device and/or a combination of devices. Further, the method 800, and all other processes described herein unless expressly specified otherwise, may include procedures in addition to those expressly depicted in the figures or described in the specification without departing from the spirit and scope of some embodiments. Similarly, the procedures of the method 800 and any other process described herein, unless expressly specified otherwise, may be performed in an order other than depicted in the figures or described in the specification, as is practicable and/or appropriate.

In some embodiments, the method 800 may comprise receiving, in connection with a play of a video game by a player, an indication of a game play input provided by the player. A player may utilize, for example, an input device (such as the input devices 104, 704 of FIG. 1 and/or FIG. 7) to interact with a game program (e.g., the game program 222 of FIG. 2) to play a video game, at 802. In some embodiments, the indication of the input may comprise an indication of a particular button pushed by the player, a timing of providing of the input by the player, an angle associated with a directional input provided by the player, a force associated with a providing of the input by the player, etc. Such information may, according to some embodiments, be stored in a memory, such as a memory of a gaming dongle as described herein.

The method 800 may, according to some embodiments, comprise determining, based on the indication of the game play input and based upon a context of the input, a game play input characteristic of the player, at 804. A context of the player's input within the game may, for example, be determined and/or recorded. In the case that a player provides a certain directional input in response to an in-game danger appearing on a display device, for example, the direction and/or timing of the player's directional input may be recorded along with an indication that the input was provided in apparent response to the display of a particular game element (e.g., the danger). Apparent response may generally be determined by timing metrics. In the case that a specific event occurs within the game, for example, a player input received substantially immediately thereafter (e.g., in a small amount of time thereafter) may be considered to be in response to the event. The timing threshold utilized to determine apparent response may vary between game types and/or game speeds (e.g., even within a particular game). For slow-paced strategy games or for other games where events are currently occurring at a slow pace, the next input provided by a player after an event may be considered to be in response to the event, even if the input is provided many seconds or more after the event. In high-action, fast-paced games or game segments, however, the player input may have to occur within seconds or fractions of a second after an event to be considered an apparent response to the event.

In some embodiments, apparent response may be otherwise determined. In the case that a player input is provided in special relation to particular elements on a display of the game, for example, the input may be considered to be an apparent response to and/or associated with elements that overlap with and/or are proximate to a location designated by the input. In the case that a player's goal is to shoot items on the display screen, for example, an input that designated a display pixel in common with a specific item may be considered to be associated with the item. Location thresholds and/or scatter regression or probability analysis may also or alternatively be utilized to determine a relation between the input and a game feature. In the case that a player shoots several times but never hits any item in the game, for example, an item that is closest to one or more of the shot inputs may be considered related. Similarly, any pattern formed by the shots may be analyzed to determine an item that was the likely target of the player. A center of mass, centriod, and/or mean or median point may be determined for a set of input data, for example, to approximate an item targeted and therefore apparently associated with the player's inputs.

According to some embodiments, the method 800 may comprise determining, based at least in part on the game play input characteristic of the player, a gaming signature representative of the player, at 806. A relationship between the player's inputs and/or types of inputs in response to various game events and/or elements may, for example, be determined. A player may, for example, tend to move an in-game character or device in a certain direction when a particular event occurs within the game (such as a reaction of the player that causes the player to move away from an in-game danger in a particular manner). As another example, an analysis of the player's inputs and related game characteristics may reveal that the player tends to (e.g., is more likely than not to and/or is very likely to) press a particular button when a particular shape or element is shown on the display screen. In such a manner, for example, unique or pseudo-unique characteristics, which may be considered behavioral biometrics, may be determined for a player. Such characteristics are generally referred to herein as a "gaming signature". In general, the more data (e.g., inputs and/or relations between inputs and game characteristics) that is captured and/or analyzed for a player, the more accurate and/or unique a player's gaming signature may become. Accordingly, it may be desirable in some embodiments, such as in the case that the gaming signature may be utilized to verify game results (e.g., for a tournament), to require and/or cause the player to play a plurality of sessions (e.g., the player must progress through several levels) prior to considering the gaming signature to be determined.

The method 800 may also or alternatively comprise utilizing the gaming signature representative of the player to verify a game result submitted by the player, at 808. An indication of the gaming signature (e.g., the gaming signature data 234 of FIG. 2) may, for example, be stored in a gaming dongle for use in verifying that the player attempting to register and/or certify a game result (or plurality of results) is the same player that achieved the result(s). A player may provide a gaming dongle storing an indication of a game result (e.g., a high score in a bowling video game) in order to enter or qualify for a tournament, for example. In some embodiments, such as in the case that a gaming signature is already associated with the player and/or an identifier of the player (e.g., the player is a registered or known player that has previously had a gaming signature determined or assigned), any indication of a gaming signature associated with play of the game that resulted in the stored result(s) may be compared to the pre-existing gaming signature to determine a probability of whether the same player achieved the result(s). If the probability is high or there is an exact match between the gaming signatures, the result(s) may be determined to be valid (e.g., the result may be determined to have been appropriately obtained by the same player attempting to enter the tournament and/or certify the result (s)). In the case that the probability is not high or there is no match between the gaming signatures, the result(s) may be determined to be invalid or secondary or other metrics (e.g., physical biometrics and/or GPS) may be utilized to attempt to further verify validity or invalidity of the result(s).

According to some embodiments, such as in the case that no preexisting gaming signature is on file for the player, the player may be required to provide a number of inputs in an attempt to match the gaming signature stored on the dongle. A gaming signature test or simulation may be conducted at a POS terminal and/or utilizing a test gaming device at a location at which the player is attempting to enter the tournament or certify the result(s), for example. In some embodiments, the player may be required to play a predetermined amount of the same game that the player is attempting to certify results for, for gaming signature comparison purposes (e.g., the player need not reproduce the high score of the previous gaming result).

Figure 9:
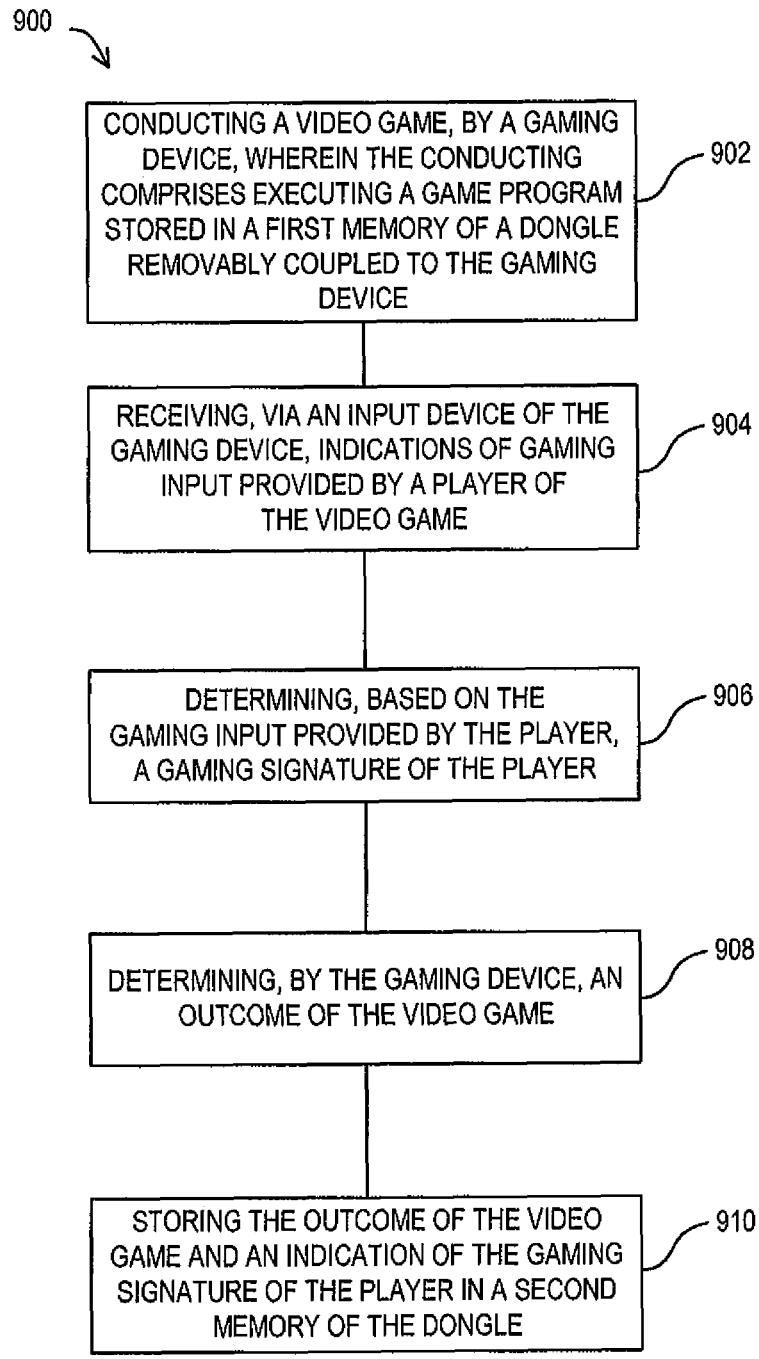
FIG. 9 is a flow diagram of a method according to some embodiments.

Referring now to FIG. 9, a flowchart of a method 900 according to some embodiments is shown. In some embodiments, the method 900 may be related to the method 800 of FIG. 8. The method 900 may, for example, comprise processes that are a continuation of and/or are supplemental to those of the method 800 of FIG. 8.

According to some embodiments, the method 900 may comprise conducting a video game, by a gaming device, wherein the conducting comprises executing a game program stored in a first memory of a dongle removably coupled to the gaming device, at 902. As described herein, for example, a gaming dongle may comprise a game 'stick' that is effectively utilized in place of a game disk, CD, CD-ROM, and/or cartridge. Players may utilize a plurality of such gaming dongles, for example, to play a plurality of different games on a gaming device. In some embodiments, a single gaming dongle may store a plurality of game programs (e.g., such that different games may be selected and played utilizing a single gaming dongle). Also as described herein, in some embodiments the gaming dongle may only store a portion of the game program, such that another portion of the game program may be stored by the gaming device and/or by another removable medium.

In some embodiments, the method 900 may comprise receiving, via an input device of the gaming device, indications of gaming input provided by a player of the video game, at 904. A player may utilize, as described herein for example, an input device such as a game controller (e.g., a gamepad, a 'nunchuck', and/or a remote control), keyboard, pointing device, joystick, etc., to provide input to a gaming device (and/or to the gaming dongle, such as in the case that the gaming dongle is coupled to the gaming device via the input device). The input may comprise game-play input such as moves, selections, and/or other game play actions. The input may also or alternatively comprise general gaming device inputs such as menu selections, configuration settings, preference settings, test and/or calibration procedures, etc. In some embodiments, all such inputs or a sampling (such as a random sampling) of such inputs may be recorded by the gaming dongle (e.g., to determine and/or facilitate determination of a gaming signature associated with the player).

According to some embodiments, the method 900 may comprise determining, based on the gaming input provided by the player, a gaming signature of the player, at 906. As described with respect to the method 800 of FIG. 8, for example, one or more of the gaming device, the gaming dongle, and/or a separate peripheral device may utilize the input provided by the player to determine and/or compute a gaming signature associated with the player. According to some embodiments, player inputs may be compared to expected player inputs to determine deviations from what is expected. In the case that a player is prompted or expected to click on a particular point or spot, for example, a deviation from the point or spot actually selected by the player may be recorded and/or utilized to determine the gaming signature. A player may routinely provide inputs that are within a certain range of distance, timing, and/or angular/directional variations from expected inputs, for example, and such deviations may therefore provide a good approximation of how the player's inputs may be identified as being associated with the player.

In some embodiments, such as in the case that any algorithms utilized to determine a player's gaming signature may be desirable to keep secret (e.g., to prevent tampering), such algorithms and/or any processor that participates in the determination may be stored within a secure perimeter. The algorithms may be stored in volatile memory, for example, and may be automatically erased upon any efforts to tamper with and/or access the algorithms and/or secure processor.

In some embodiments, the method 900 may comprise determining, by the gaming device, an outcome of the video game, at 908. The outcome may comprise, for example, a final score and/or achievement obtained by the player, or may also or alternatively comprise some intermediate or final score, achievement, statistic, or other parameter. In some embodiments, the outcome may comprise a game result as described herein. According to some embodiments, the specific outcome or type of outcome may be determined by the gaming device, by the gaming dongle, by a peripheral device, and/or by a server (such as a Web server). While scores represent a typical outcome that is utilized to compare player's achievements and/or to judge results of a competition or tournament, in some embodiments one or more other or additional outcomes may be utilized. In some embodiments, the selected type of outcome may be based on some central determination that is not made known to the player. A Web server in communication with the gaming device may, upon conclusion of a game play (and/or upon some intermediate level, stage, or occurrence) for example, select a type of outcome to be utilized in determining a winner of a tournament. Players of the tournament may be unaware of which type of outcome or achievement may win the tournament, in advance of playing the game. In some embodiments, the gaming dongle may make such a determination. Different classes of gaming dongle may be sold with coded instructions to select a particular outcome type for a tournament, for example, and players may not know which class of dongle was purchased. According to some embodiments, the determination of the type of outcome may be random (e.g., the gaming device, the gaming dongle, a peripheral device, and/or a server may randomly determine which type(s) of outcome(s) are of interest).

According to some embodiments, the method 900 may comprise storing the outcome of the video game and an indication of the gaming signature of the player in a second memory of the dongle, at 910. In some embodiments, the second memory may be disposed within a secure perimeter of the gaming dongle, as described herein. Upon achievement of the outcome and/or upon a determination of which type(s) of outcome(s) to stored, for example, a signal may be transmitted to the gaming dongle that causes the gaming dongle to store an indication of the outcome(s). The gaming dongle and/or the stored indication may then, for example, be utilized to enter and/or win a tournament or other competition. The gaming signature of the player may, in some embodiments, be utilized to verify that the player attempting to enter or win the tournament (or otherwise certify the outcome) is likely to be the same player that achieved the outcome(s). In some embodiments, however, such as in the case that symmetry of player identities is not desired or required, the gaming signature data and/or gaming signature verification may not be necessary in the method 900.

Figure 10:
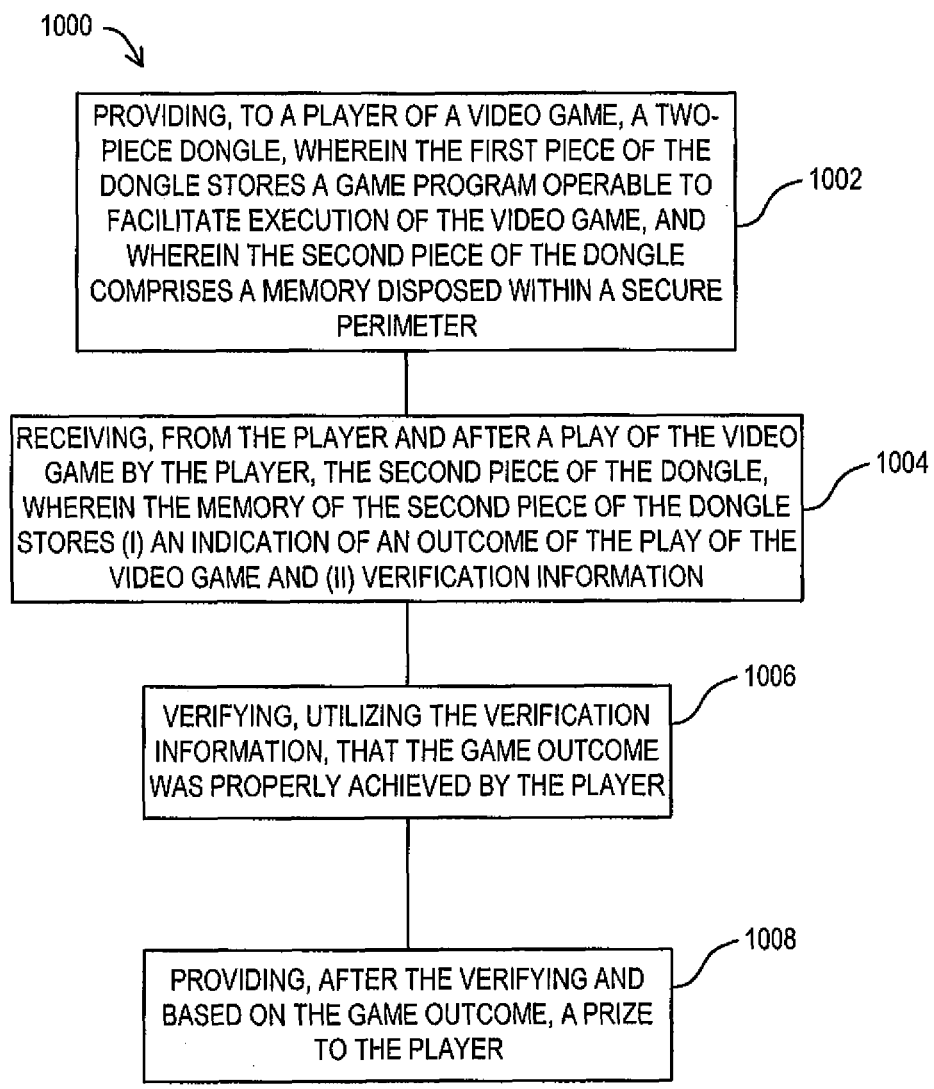
FIG. 10 is a flow diagram of a method according to some embodiments.

Referring now to FIG. 10, a flowchart of a method 1000 according to some embodiments is shown. In some embodiments, the method 1000 may be related to any of the methods 800, 900 of FIG. 8 and/or FIG. 9. The method 1000 may, for example, comprise processes that are a continuation of and/or are supplemental to those of the methods 800, 900 of FIG. 8 and/or FIG. 9.

According to some embodiments, the method 1000 may comprise providing, to a player of a video game, a two-piece dongle, wherein the first piece of the dongle stores a game program operable to facilitate execution of the video game, and wherein the second piece of the dongle comprises a memory disposed within a secure perimeter, at 1002.

In some embodiments, the method 1000 may comprise receiving, from the player and after a play of the video game by the player, the second piece of the dongle, wherein the memory of the second piece of the dongle stores (i) an indication of an outcome of the play of the video game and (ii) verification information, at 1004.

According to some embodiments, the method 1000 may comprise verifying, utilizing the verification information, that the game outcome was properly achieved by the player, at 1006.

In some embodiments, the method 1000 may comprise providing, after the verifying and based on the game outcome, a prize to the player, at 1008.

In some embodiments, the method 1000 may also or alternatively comprise other procedures. The method 1000 may comprise, for example, one or more of: (i) requesting that the player provide a code that is caused to be output by the first piece of the dongle; (ii) receiving an indication of the code from the player; and/or (iii) comparing the code to the verification information to (a) verify that the second piece of the dongle is related to the first piece of the dongle, and/or (b) verify the identity of the player.

V. Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget"

may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A system, comprising:
    a first connector oriented to removably couple to one or more of (i) a gaming device, and (ii) a gaming input device;
    a first memory in communication with the first connector, the first memory storing at least a portion of a game program;
    a secure perimeter, comprising:
        a second memory in communication with the first connector, the second memory storing an indication of an amount of value, wherein some portion of the amount of value is consumed by an execution of the game program;
        a second connector in communication with the second memory, wherein the second connector is oriented to interface with a device configured to replenish the amount of value; and
        a GPS device in communication with one or more of: (i) the first connector; (ii) the second connector; (iii) the first memory; and (iv) the second memory; and
    wherein one or more of the first memory and the second memory further stores instructions, that when executed by a processor result in:
    determining, for a game based on an execution of the game program, a gaming signature of a player of the game, the gaming signature behavioral biometric of the player of the game.

2. The system of claim 1, wherein the first connector and the second connector are embodied in a single connector.

3. The system of claim 1, wherein the second connector comprises a magnetic stripe reader.

4. The system of claim 1, wherein the second connector comprises a wireless communication device.

5. The system of claim 1, wherein one or more of the first connector and the second connector comprise a USB connector.

6. The system of claim 1, wherein both of the first connector and the second connector comprise a USB connector.

7. The system of claim 1, wherein a determination of the player's gaming signature is based on input received via an input device operated by the player.

8. The system of claim 7, further comprising:
    the gaming device, wherein the gaming device is in communication with one or more of the first memory and the second memory via the first connector; and
    the input device, wherein the input device is in communication with the gaming device.

9. The system of claim 1, further comprising:
    the processor.

10. The system of claim 9, wherein the processor is disposed within the secure perimeter.

11. The system of claim 1, wherein the GPS device is disposed within the secure perimeter.

12. The system of claim 1, wherein the GPS device is configured to prevent the game program from being executed based on positioning information sensed by the GPS device.

13. The system of claim 1, wherein the second memory further stores an indication of a result of a game based on an execution of the game program.

14. The system of claim 1, wherein the second memory further stores an indication of a software version of the game program.

15. The system of claim 1, further comprising:
    a biometric device in communication with one or more of: (i) the first connector; (ii) the second connector; (iii) the first memory; and (iv) the second memory.

16. The system of claim 15, wherein the biometric device is configured to prevent the game program from being executed based on biometric information sensed by the biometric device.

17. A system, comprising:
a first dongle portion, comprising:
   a first connector oriented to removably couple to a gaming device; and
   a first memory in communication with the first connector, the first memory storing a game program;
a second dongle portion, comprising:
   a second connector oriented to removably couple to the first dongle portion; and
   a secure perimeter, comprising:
     a second memory in communication with the second connector, the second memory storing an indication of an amount of value, wherein some portion of the amount of value is consumed by an execution of the game program; and
     a GPS device in communication with one or more of: (i) the first connector; (ii) the second connector; (iii) the first memory; and (iv) the second memory, wherein the GPS device is configured to prevent, without receiving a command from an device external to the secure perimeter, the name program from being executed based on positioning information sensed by the GPS device.

18. The system of claim 17, wherein the GPS device is disposed within the secure perimeter.

19. The system of claim 1, wherein the GPS device is configured to prevent, without receiving a command from an device external to the secure perimeter, the game program from being executed based on positioning information sensed by the GPS device.

\* \* \* \* \*